US011347392B1

(12) United States Patent
Germann et al.

(10) Patent No.: US 11,347,392 B1
(45) Date of Patent: May 31, 2022

(54) USER INTERACTIONS AND FEEDBACK SIGNALS FOR SHARING ITEMS TO A NETWORK DESTINATION

(71) Applicant: MICROSOFT TECHNOLOGY LICENSING, LLC, Redmond, WA (US)

(72) Inventors: Joerg Perieno Germann, Vancouver (CA); Aleksandra Dorota Kopczynska-Dobosz, Redmond, WA (US); Steven James Bailey, Redmond, WA (US); Gregor Noriskin, Vancouver (CA); Hansel Ivan Gene IP, Seattle, WA (US); Vivek Khurana, Redmond, WA (US); Anne Catherine Feldman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/349,080

(22) Filed: Jun. 16, 2021

(51) Int. Cl.
*G06F 3/04883* (2022.01)
*G06F 3/01* (2006.01)
(Continued)

(52) U.S. Cl.
CPC .......... *G06F 3/04883* (2013.01); *G06F 3/016* (2013.01); *G06F 3/0482* (2013.01); *H04W 88/02* (2013.01)

(58) Field of Classification Search
CPC ..... G06F 3/04883; G06F 3/0482; G06F 3/016
See application file for complete search history.

(56) References Cited

U.S. PATENT DOCUMENTS 8,493,354 B1 * 7/2013 Birnbaum ............... G06F 3/016
345/173
9,253,270 B2 2/2016 Bharshankar et al.
(Continued)

FOREIGN PATENT DOCUMENTS

WO 2021011937 A1 1/2021

OTHER PUBLICATIONS

"Easy Sharing with Swipe to Share", Retrieved From: https://web.archive.org/web/20201019155427/https:/support.izotope.com/hc/en-us/articles/360042518654-Easy-sharing-with-Swipe-To-Share, Oct. 19, 2020, 2 Pages.
(Continued)

*Primary Examiner* — Mong-Shune Chung
(74) *Attorney, Agent, or Firm* — Jacob P. Rohwer; Newport IP, LLC

(57) ABSTRACT

The techniques described herein improve an item (e.g., photo) sharing experience on mobile devices. In one embodiment, an application presents items in a stacked configuration and receives swipe-based touch gestures that reflect user intent with regard to whether or not a photo is to be shared to a network destination. After a directional swipe occurs on the top-most item, the next item in the stacked configuration is displayed for a next directional swipe. This process is repeated until all the items in the stacked configuration have been displayed to the user. In another embodiment, the application receives a continuous user gesture that traverses a set of photos laid out in a grid configuration. When performing the continuous user gesture, whether or not the user pauses on a photo reflects a user intent with regard to whether or not the photo is to be shared to a network destination.

20 Claims, 16 Drawing Sheets

(51) Int. Cl.
*G06F 3/0482* (2013.01)
*H04W 88/02* (2009.01)

(56) References Cited

U.S. PATENT DOCUMENTS

| | | | |
|---|---|---|---|
| 2014/0281955 A1 | 9/2014 | Sprenger | |
| 2014/0331187 A1* | 11/2014 | Hicks | G06F 3/0488 715/845 |
| 2016/0094536 A1 | 3/2016 | Krueger | |
| 2017/0357320 A1* | 12/2017 | Chaudhri | G06F 3/0412 |
| 2018/0189972 A1* | 7/2018 | Humbert | G06T 7/32 |
| 2021/0055842 A1* | 2/2021 | Husain | G06F 3/0488 |

OTHER PUBLICATIONS

"Swipe & Share (Panasonic)", Retrieved From: https://web.archive.org/web/20160609123715/https://www.lcd-compare.com/definition-de-swipe-and-share.htm, Jun. 9, 2016, 6 Pages.

"Swipe to Share", Retrieved From: https://forscore.co/swipe-to-share/, Sep. 30, 2016, 1 Page.

Sharma, Abhishek, "Swipe and Share App for Micromax A110 and Android Devices", Retrieved From: https://web.archive.org/web/20201130232043/https://www.skyneel.com/swipe-and-share-app-for-micromax-a110-and-android-devices, Nov. 30, 2020, 6 Pages.

Weaver, Brandon, "3 New Instagram Stories Tools to Make You a Better Marketer", Retrieved From: https://web.archive.org/web/20200925130129/https://instapage.com/blog/what-are-instagram-story-links, Sep. 25, 2020, 20 Pages.

Falconer, James, "FotoSwipe Makes Sharing Photos Between Android and iOS Devices Incredibly Easy", Retrieved From: https://www.androidcentral.com/fotoswipe-android-takes-photo-sharing-whole-new-level, Oct. 21, 2014, 6 Pages.

Lazzaro, Sage, "Tinder for News: Swipe Right to Discard a Story, Swipe Left to Share on Social Media", Retrieved From: https://observer.com/2014/06/tinder-for-news-swipe-right-to-discard-a-story-swipe-left-to-share-on-social-media/, Jun. 26, 2014, 3 Pages.

* cited by examiner

USER INTERACTIONS AND FEEDBACK SIGNALS FOR SHARING ITEMS TO A NETWORK DESTINATION

BACKGROUND

Social media and some other types of platforms enable a mobile experience for the sharing (e.g., uploading) of photos to a user's network profile/page, such that other users can like or comment on the shared photos. In many instances, these platforms allow for multiple photos to be shared in a single post on the user's network profile/page. Accordingly, an application that implements the mobile experience allows for a user to view stored photos and select ones that the user wishes to share in a post.

Unfortunately, the conventional selection processes used by mobile applications of these platforms are not ideal and often require a series of different and specific types of user touch inputs to sort, view, and/or select the photos to be shared. More specifically, a user is often required to scroll through a series of unorganized photos across various screens, and when a desired photo is identified for sharing, the user must provide a touch input to select the desired photo and add it to a post. The user must then return to the unorganized photos and start scrolling through them again so the selection process can be repeated for each desired photo until a final number of desired photos are identified for sharing in a single post. This whole process can be repetitive, cumbersome, and time consuming for the user, thereby causing unnecessary frustrations due to the possibility of inadvertent inputs and other missteps.

It is with respect to these and other considerations the disclosure made herein is presented.

SUMMARY

The techniques disclosed herein improve a photo sharing experience on mobile devices. Additionally, the techniques disclosed herein can improve the sharing of other types of items created and/or stored on mobile devices as well (e.g., videos, files, images, user contact information, etc.). Thus, while some of the examples described herein are illustrated and discussed with respect to "photos" (e.g., images or pictures captured by an image capture device incorporated into a mobile device), it is understood in the context of this disclosure that the techniques can be implemented for other types of items that can be created and/or stored on a mobile device. In some instances, different types of items can be selected and shared together (e.g., a video and a photo).

As further described herein, an application executing on a mobile device is configured to provide a more efficient and streamlined item selection process provided a situation where a user of the mobile device wants to share multiple items with a network destination in a single sharing instance. As used herein, "sharing" includes configuring and sending a group of items to the network destination, where the group of items can then be processed in accordance with a type of functionality offered by the network destination. To this end, and for illustrative purposes, examples of network destinations can include a social networking platform that posts the group of items to a user's social media profile/page, an enterprise networking platform that posts the group of items to a user's enterprise profile/page, a file storage platform that stores files (e.g., emails, word processing documents, spreadsheet documents, presentation documents, images, etc.) together in a directory or file folder of a user account, etc.

In further examples, a network destination can define a specific "space" or "area" of a user account hosted by one of the aforementioned example platforms. For instance, a user may configure different groups of approved contacts (e.g., family, friends, co-workers, etc.) for different streams of media, and a group of items can be shared with a group of approved contacts via an individual media stream. In the context of photos, a user may have one stream for family where photos intended for family viewing are posted, another stream for high school friends where photos of recent events with such friends are posted, yet another stream for college/university friends where photos of recent events with such friends are posted, and so forth. Accordingly, in these further examples, a user must invite and/or authorize individual users to view individual media streams, and therefore, the sharing is secured based on established boundaries between media streams. That is, a user contact cannot view photos posted to all the media streams unless the user contact is invited and/or authorized by the user to view the photos posted to all the media streams.

The single sharing instance refers to a scenario where user touch input is provided to a mobile device to select the multiple items so they can be sent to the network destination as a group for further processing. The user input is touch input implemented using some sort of an input mechanism (e.g., finger, thumb, digital pen, a stylus, etc.) and a touch-screen display configured to sense parameters of the touch input (e.g., the position of the touch-input, the pressure of the touch input, and/or the inertia of the touch input). As described herein, the types of touch input used to select photos for sharing in a single sharing instance do not require the user to scroll through (e.g., across a plurality of screens) a large set of unorganized photos. Rather, the application described herein organizes the photos into configurations or layouts that enable improved user selection based on various types of touch input.

As mentioned above, in one example, the items are photos the user wants to share with other users. Accordingly, the network destination may be a social media platform configured to share the photos, in a single post, on the user's social media profile/page and/or via an individual photo stream. The single post may be associated with an event or other circumstance that may be referred to as a "moment of joy". Thus, a moment of joy can include a thematically or temporally grouped set of photos a user has previously taken using a mobile device.

In a first embodiment, the application executing on the mobile device is configured to receive, as the user input, swipe-based touch gestures that reflect user intent with regard to whether or not a photo is to be shared to a network destination. A swipe-based tough gesture typically occurs when an input mechanism (e.g., a finger, a thumb, a digital pen, a stylus, etc.) is directionally moved across a touch-screen display (e.g., in a horizontal or a vertical direction). To initiate the techniques described herein, a user may open the application and select a sharing user interface control element to share photos. In response, the application is configured to access photos stored on a mobile device and configure the photos into a stacked configuration to be presented on the touch-screen display. In the stacked configuration, a user of the mobile device is able to touch a photo at the top of the stack (e.g., a pile of photos), and swipe in different directions to communicate the user intent with respect to the photo. After a directional swipe occurs, the next photo in the stacked configuration is displayed on top for a next directional swiping action. This process is repeated until all the photos in the stacked configuration have been displayed to the user, reviewed by the user, and swiped by the user. Alternatively, this process is repeated until a maximum number of photos capable of being shared in a single sharing instance has been reached, as further discussed herein.

In one example, the application may associate a first swipe direction (e.g., to the right side of the touch-screen display) with a first user intent to share the photo to a network destination. The application may associate a second swipe direction (e.g., to the left side of the touch-screen display) with a second user intent to not share the photo to the network destination. The associations of swipe directions (e.g., right, left, up, down, etc.) with user intents may be configured as default associations within the application or may be user defined for the application. In various examples, swiping in a direction associated with a user intent to not share the photo causes the application to apply a tag to, or insert a tag into, metadata associated with a photo. The tag indicates that the photo has been reviewed by the user for sharing purposes and that the user has decided the photo is one to not share with other users (e.g., the user intends to keep the photo private for any one of various reasons).

The network destination to which photos are to be shared may be a preselected network destination determined based on user input received before the photos are arranged in the stacked configuration. For instance, the application can present the user with a list of predefined network destinations to which photos can be sent, and the user can make a selection from the list before the photos are arranged in the stacked configuration. Alternatively, the application can present the user with the list of predefined network destinations when the top-most photo is displayed in the stacked configuration. The application may be configured to further display user interface elements that enable the user to change a swipe direction from one network destination to another, or from one user intent to another.

As mentioned above, first and second swipe directions can be respectively associated with a first user intent to share a photo to a network destination and a second user intent to not share the photo with the network destination. However, the application can be configured to implement any number of different swipe directions that correspond to a number of different user intents. For instance, the application can associate a third swipe direction (e.g., upwards from the touch-screen display or downwards from the touch-screen display) with a third user intent to share the photo with another network destination that is different than the network destination associated with the first swipe direction. Thus, different swipe directions (e.g., up, down, left, right, upper left, upper right, lower left, lower right, etc.) can be associated with different user intents and/or network destinations.

In various examples, the photos displayed in the stacked configuration, as well as the photos displayed in the grid configuration further discussed herein, include a set of recommended photos that have been identified from a larger set of photos stored on a mobile device. In one example, the application evaluates photo metadata and selects photos to recommend to the user for sharing if the photos have not yet been reviewed by the user for sharing purposes. Once the user reviews a recommended photo for sharing purposes, the application may update the photo's metadata to reflect that the photo has been reviewed by the user for sharing purposes. In another example, the application can include a recommendation module that uses artificial intelligence and/or machine learning to identify a set of recommended photos to be presented to the user for sharing purposes based on various factors. For instance, one factor may be when the photo was taken, as a user is more likely to share more recently snapped photos. Another factor may include image feature analysis. This analysis may identify features that are likely more important to a user when it comes to sharing (e.g., faces, events, object depth, image quality features such as object edges and environment lighting, etc.). In a specific example, the application can match image features with keywords the user has already typed and/or entered for a post (e.g., match a user identification with recognized facial features for the user identification). In this way, the recommendation module can identify and recommend photos that are more relevant to a moment of joy. In some implementations, the number of photos recommended by the recommendation module can be capped at a predetermined maximum number (e.g., ten, twenty, thirty, forty, etc.).

In another embodiment, the application executing on the mobile device is configured to receive, as the user input, a continuous user gesture that traverses a set of photos which are laid out in a grid configuration. Physical contact is maintained between the input mechanism (e.g., a finger, a thumb, a digital pen, a stylus, etc.) and the touch-screen display as the input mechanism moves across various positions on the touch-screen display where the photos (e.g., thumbnail versions) are displayed, thereby creating this continuous user gesture. When performing the continuous user gesture, whether or not the user pauses on a particular photo reflects a user intent with regard to whether or not the particular photo is to be shared to a network destination. Again, to initiate the techniques described herein, a user may open the application and select a sharing user interface control element to share photos. In response, the application is configured to access photos stored on a mobile device and configure the photos into a grid configuration to be presented on the touch-screen display. In the grid configuration, a user of the mobile device is able to implement a continuous touch gesture that moves from one photo to the next, without scrolling across multiple screens.

If the user sees a photo they intend to share, the user halts the position of the continuous user gesture for a predetermined period of time (e.g., one second, two seconds, etc.), but does not break physical contact with the touch-screen display. In other words, the user pauses the continuous user gesture and essentially touches the photo for a predetermined period of time. This pause signals a first user intent to add the underlying photo to the subset of photos to be shared to a network destination. When the user does not pause on a photo, but rather the continuous user gesture passes over the photo with uninterrupted movement, the user signals a second user intent to not share the photo to the network destination.

When the user has selected all the images they wish to add, the user can break contact between the input mechanism and the touch-screen display (e.g., raise their finger off the touch-screen display) for a specific period of time. This break in contact configures the application to display a confirmation UI element at the position on the screen where the input mechanism breaks physical contact so that the user can confirm that the selection process has ended. Additionally, the application can display a list of network destinations at this point in time and at the position on the touch-screen display where the input mechanism breaks physical contact so that the user can select a network destination to which the selected photos are to be shared.

In a further embodiment, the directional swipe-based gestures associated with different user intents, as discussed above, can alternatively be implemented in association with the grid configuration. That is, the user can place the input mechanism on each of the photos in the grid configuration and swipe in various directions in order to signal the different user intents with regard to sharing a photo.

In some scenarios, a network destination may implement a policy that restricts a number of photos (e.g., five, ten, fifteen, etc.) that can be shared in a single sharing instance (e.g., a single post to a social media page and/or to a stream of photos). In other words, the network destination only allows a number of photos up to a predefined maximum number for a single sharing instance. When a user is accumulating photos to share in a single sharing instance, the user may be focused on determining which photo to select, and therefore, the user has a tendency to lose track of how many photos have already been selected for sharing at a given time in the selection process.

Accordingly, the application is configured to generate signals useable to provide haptic feedback for the user input configured to select photos (e.g., a user swipe or a user pause). Haptic feedback can provide a user with a sense of touch and can include a vibration and/or a sound. A haptic feedback signal generated by the application for an individual user input includes a feedback intensity value. The application is configured to increase the feedback intensity value every time a new photo is selected for sharing (e.g., increase the vibration and/or the volume of the sound). In this way, the haptic feedback provides a sense of accumulation, to the user of the mobile device, indicating the current number of selected photos to be shared with respect to the predefined maximum number of photos that can be shared in the single sharing instance.

In some instances, the haptic feedback for selected photos may be a first type or composition of haptic feedback (e.g., first texture and/or a first sound) that increases in intensity so the user is provided with a sense of accumulation. However, when the user reaches the predefined maximum number of photos as a result of the final photo being added, the application can provide a second type or composition of haptic feedback (e.g., a different texture and/or a different sound) that is different than the first type or composition of haptic feedback in order to indicate to the user that no more accumulation is possible because the predefined maximum number has been reached.

Consequently, the application described herein provides a more efficient and streamlined item selection process provided a situation where a user of the mobile device wants to share multiple items with a network destination in a single sharing instance. The techniques disclosed herein provide a number of features that improve existing computing devices. For instance, data computing resources such as processor cycles, memory, and power are conserved because the user no longer has to scroll through a large set of unorganized photos to make selections. Further, the ease of use helps avoid inadvertent inputs and other user missteps when attempting to share the selected items to the network destination. Other technical benefits not specifically mentioned herein can also be realized through implementations of the disclosed subject matter.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The techniques described herein improve an item (e.g., photo) sharing experience on mobile devices. In one embodiment, an application presents items in a stacked configuration and receives swipe-based touch gestures that reflect user intent with regard to whether or not a photo is to be shared to a network destination. After a directional swipe occurs on the top-most item, the next item in the stacked configuration is displayed for a next directional swipe. This process is repeated until all the items in the stacked configuration have been displayed to the user. In another embodiment, the application receives a continuous user gesture that traverses a set of photos laid out in a grid configuration. When performing the continuous user gesture, whether or not the user pauses on a photo reflects a user intent with regard to whether or not the photo is to be shared to a network destination.

Figure 1:
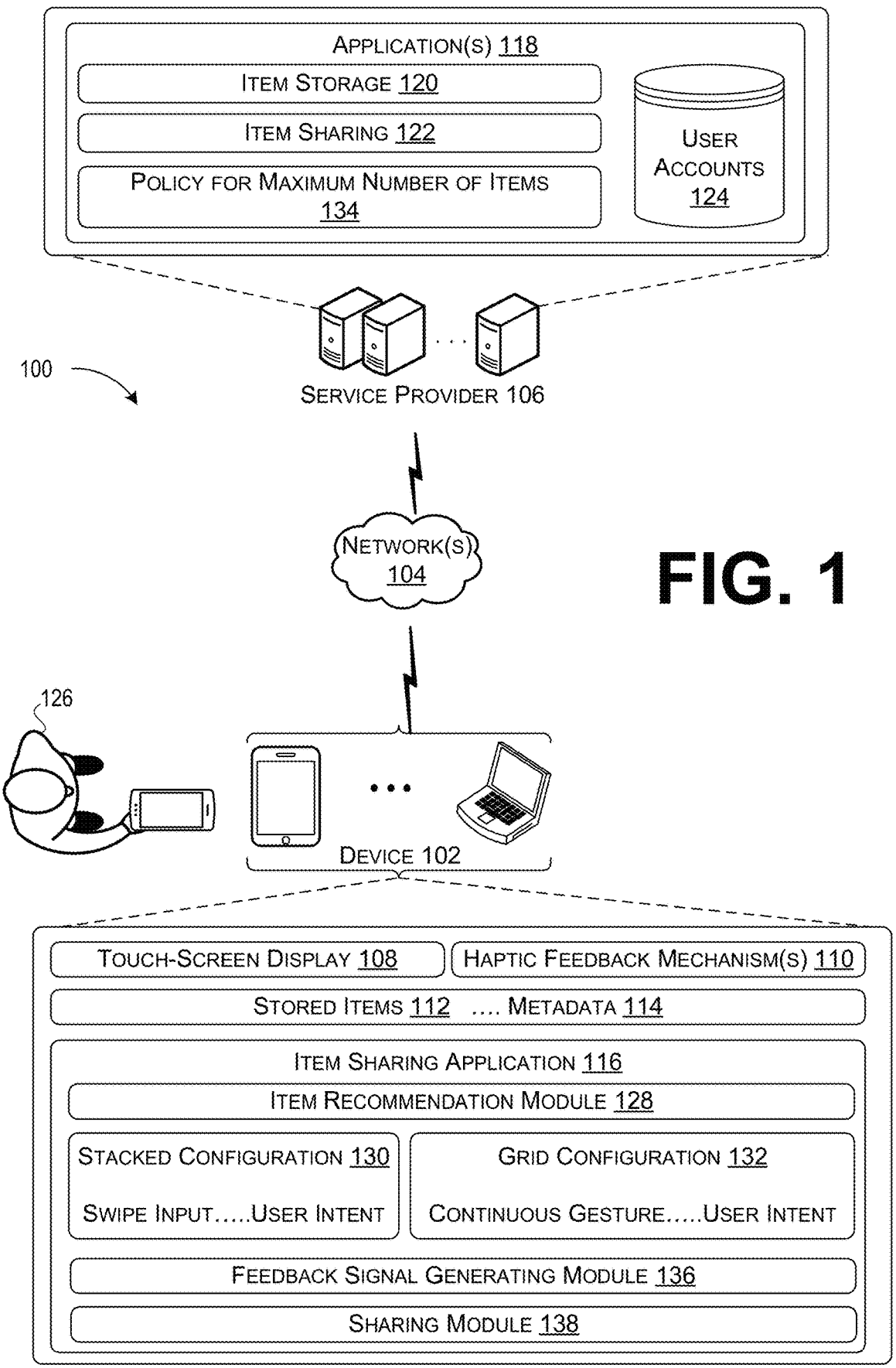
FIG. 1 illustrates an example environment in which a user device is configured to share items, over network(s), to a network destination offered by a service provider using the improved selection techniques described herein.

FIG. 1 illustrates an example environment 100 in which a user device 102 is configured to share items, over network(s) 104, to a network destination offered by a service provider 106. As shown, the user device 102 includes a touch-screen display 108 and haptic feedback mechanism(s) 110 which enable performance of the disclosed subject matter. Furthermore, the user device 102 includes components to store items 112 and corresponding metadata 114 for the items 112 (e.g., date/time of creation, storage size, etc.). Finally, the user device 102 includes an item sharing application 116, as described herein.

The service provider 106 includes a network-side application 118 that comprises at least part of the network destination for item sharing. Accordingly, the application 118 is configured to implement item storage 120 and/or item sharing 122 in association with various user accounts 124. The item sharing application 116 executing on the device 102 is configured to provide a more efficient and streamlined item selection process provided a situation where a user 126 of the device 102 wants to share multiple items with the application 118 in a single sharing instance. As used herein, "sharing" includes configuring and sending a group of items to the application 118, where the group of items can then be processed in accordance with a type of functionality offered by the application 118. To this end, and for illustrative purposes, the service provider 106 may be a social networking platform that posts the group of items to the user's 126 social media profile/page, an enterprise networking platform that posts the group of items to the user's 126 enterprise profile/page, a file storage platform that stores files (e.g., emails, word processing documents, spreadsheet documents, presentation documents, images, etc.) together in a directory or file folder of a user account 124, etc.

In some embodiments, the application 118 can define separate "spaces" or "areas" of a user account 124, and one of these individual spaces or areas may comprise the network destination to which items are shared. For instance, the user 126 may configure different groups of approved contacts (e.g., family, friends, co-workers, etc.) for different streams of media, and a group of items can be shared with a group of approved contacts via an individual media stream. In the context of photos, a user may have one stream for family where photos intended for family viewing are posted, another stream for high school friends where photos of recent events with such friends are posted, yet another stream for college/university friends where photos of recent events with such friends are posted, and so forth. Accordingly, in these embodiments, the user 126 must invite and/or authorize individual users to view individual media streams, and therefore, the sharing is secured based on established boundaries between media streams. That is, a user contact cannot view photos posted to all the media streams unless the user contact is invited and/or authorized by the user 126 to view the photos posted to all the media streams.

A single sharing instance refers to a scenario where user touch input is provided, to the device 102 by way of the touch-screen display 108, to select multiple items so they can be sent to the application 118 as a group for further processing. The user input is touch input implemented using some sort of an input mechanism (e.g., finger, thumb, digital pen, a stylus, etc.), and thus, the touch-screen display includes components configured to sense parameters of the touch input (e.g., the position of the touch-input, the pressure of the touch input, and/or the inertia of the touch input).

In various examples, the item sharing application 116 includes an item recommendation module 128 configured to identify items to be recommended to the user 126 for sharing purposes. For instance, the item recommendation module 128 is configured to evaluate photo metadata 114 and select photos to recommend to the user 126 for sharing if the photos have not yet been reviewed by the user 126 for sharing purposes. Once the user reviews a recommended photo for sharing purposes, the item sharing application 116 may update the photo's metadata 114 to reflect that the photo has been reviewed by the user for sharing purposes.

The item recommendation module 128 can use artificial intelligence and/or machine learning to identify a set of recommended items to be presented to the user for sharing purposes based on various factors. For instance, and with respect to photos, one factor may be when the photo was taken, as a user is more likely to share more recently snapped photos. Another factor may include image feature analysis. This analysis may identify features that are likely more important to a user when it comes to sharing (e.g., faces, events, object depth, image quality features such as object edges and environment lighting, etc.). In a specific example, the item recommendation module 128 can match image features with keywords the user 126 has already typed and/or entered for a post (e.g., match a user identification with recognized facial features for the user identification). In this way, the item recommendation module 128 can identify and recommend photos that are more relevant to a moment of joy. In some implementations, the number of items recommended by the item recommendation module 128 can be capped at a predetermined maximum number (e.g., ten, twenty, thirty, forty, etc.). This number may correspond to a number of icons or thumbnail item representations, of a default size, that can fit on a single screen so no scrolling is needed.

As described herein, the types of touch input used to select items for sharing in a single sharing instance do not require the user to scroll through (e.g., across a plurality of screens) a large set of unorganized items. Rather, the item sharing application 116 organizes items into configurations or layouts that enable improved user selection based on various types of touch input. In one embodiment further illustrated with respect to FIGS. 2A-2E and 3, the item sharing application 116 is configured to organize items in a stacked configuration 130, where different swipe-based user inputs are mapped to different user intents with respect to selecting and sharing items. In another embodiment further illustrated with respect to FIGS. 4A-4D and 5, the item sharing application 116 is configured to organize items in a grid configuration 132, where elements of a continuous user gesture are mapped to different user intents with respect to selecting and sharing items.

In some scenarios, the network-side application 118 may implement a policy that restricts a number of items (e.g., five, ten, fifteen, etc.) that can be shared in a single sharing instance to a predefined maximum number of items 134. For instance, the application may only allow a single post to a social media page and/or to an individual media stream to include up to five photos. When a user is accumulating items to share in a single sharing instance, the user may be focused on determining which item to select, and therefore, the user has a tendency to lose track of how many items have already been selected for sharing at a given time in the selection process.

In further scenarios, the network-side application 118 may implement a policy that limits a size of an individual item (e.g., 1.0 megabytes, 2.0 megabytes, etc.) to be shared and/or that limits a feature related to size (e.g., resolution of a photo must not exceed a maximum resolution). Consequently, the item recommendation module 128 may only identify and recommend items for sharing that are within these limits for the network-side application 118.

Accordingly, the item sharing application 116 can include a feedback signal generating module 136 that generates signals useable by the haptic feedback mechanism(s) 110 (e.g., tactile sensors, speakers, etc.) to provide haptic feedback for the user input configured to select items. The haptic feedback is intended to provide a user with a sense of touch and can include a vibration and/or a sound. A haptic feedback signal generated by the feedback signal generating module 136 for an individual user input includes a feedback intensity value. The feedback signal generating module 136 is configured to increase the feedback intensity value every time a new item is selected for sharing (e.g., increase the vibration and/or the volume of the sound). In this way, the haptic feedback provides a sense of accumulation, to the user 126 of the mobile device 102, indicating the current number of selected items to be shared with respect to the predefined maximum number of items 134 that can be shared in the single sharing instance.

Once selected, a sharing module 138 configures a group of selected items for network transmission to the target network destination (e.g., application 118 and/or a media stream). More specific examples of the disclosed subject matter are provided herein with respect to a photo sharing experience on mobile devices. However, the techniques can be implemented for other types of items created and/or stored on the device 102 as well (e.g., videos, files, images, user contact information, etc.). In some instances, different types of items can be selected and shared together (e.g., a video and a photo).

Figure 2A:
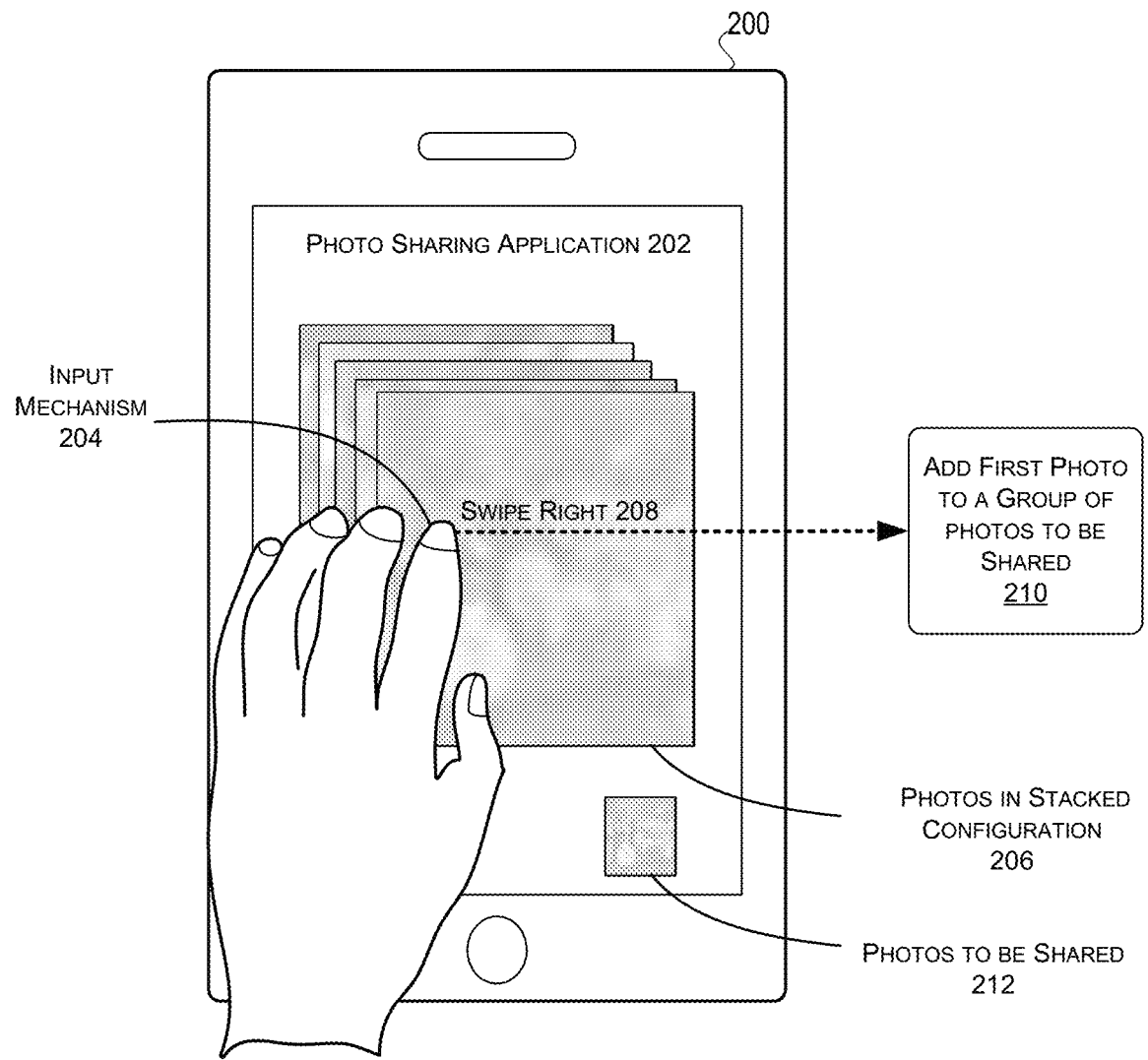
FIG. 2A illustrates an example swipe gesture that can communicate a user intent to select a photo to be shared to a network destination in a single sharing instance.

FIG. 2A illustrates an example swipe gesture that can be implemented on a touch-screen display of a smartphone device 200 (e.g., user device 102) to select an initial photo to be shared to a network destination in a single sharing instance. As described above, a photo sharing application 202 (e.g., item sharing application 116) executes on the smartphone device 200 to receive swipe-based touch gestures that reflect user intent with regard to whether or not a photo is to be shared to a network destination. A swipe-based tough gesture typically occurs when an input mechanism 204 (e.g., a finger, a thumb, a digital pen, a stylus, etc.) is directionally moved across a touch-screen display (e.g., in a horizontal or a vertical direction).

The photo sharing application 202 may associate a first swipe direction (e.g., to the right side of the touch-screen display) with a first user intent to share the photo to a network destination. The photo sharing application 202 may associate a second swipe direction (e.g., to the left side of the touch-screen display) with a second user intent to not share the photo to the network destination. The associations of swipe directions (e.g., right, left, up, down, etc.) with user intents may be configured as default associations within the photo sharing application 202 or may be user defined for the photo sharing application 202.

To initiate the sharing experience, the user 126 may open the photo sharing application 202 and select a sharing user interface control element to share photos. In response, the photo sharing application 202 is configured to access photos stored on the smartphone device 200 and configure the photos into a stacked configuration 206 to be presented on the touch-screen display. In various examples, the photos in the stacked configuration 206 are a set of recommended photos identified by the item recommendation module 128 described above. A number of these photos may be limited to a threshold maximum number. For example, twenty photos may be recommended so the user 126 can select five, which may be the predefined maximum number of photos 134 that can be shared and posted to a social media page and/or media stream.

In the stacked configuration 206, a user 126 is able to touch a photo at the top of the stack (e.g., a pile of photos), and swipe in different directions to communicate the user intent with respect to the photo. As shown in FIG. 2A, the user swipes to the right 208 to communicate a user intent to share the photo with a network destination and/or to add a first photo to a group of photos to be shared in a single sharing instance 210.

In some examples, the added photo may be visually moved to a different stack of photos 212 that represent those that have already been selected for sharing. This can provide a form of visual feedback and/or confirmation with regard to a selection. Depending on display space, the location of the stack of photos 212 on the touch-screen display may be configured along the direction of the swipe (e.g., to the right) such that it appears the user drags the top-most photo from one stack 206 to the other stack 212. However, as shown in FIG. 2A, the other stack 212 may alternatively be displayed in a different location such as below the stack 206 being reviewed by the user. In this scenario, it may appear to the user that the selected photo is being swiped or dragged off the screen on the right side and then the photo may reappear on the stack 212 in the lower right corner. The size of the photos in the stack 212 are likely smaller than the size of the photos in the stack 206 because the user wants the photos in the stack 206 enlarged so they can more easily review and evaluate the photo for sharing purposes.

Figure 2B:
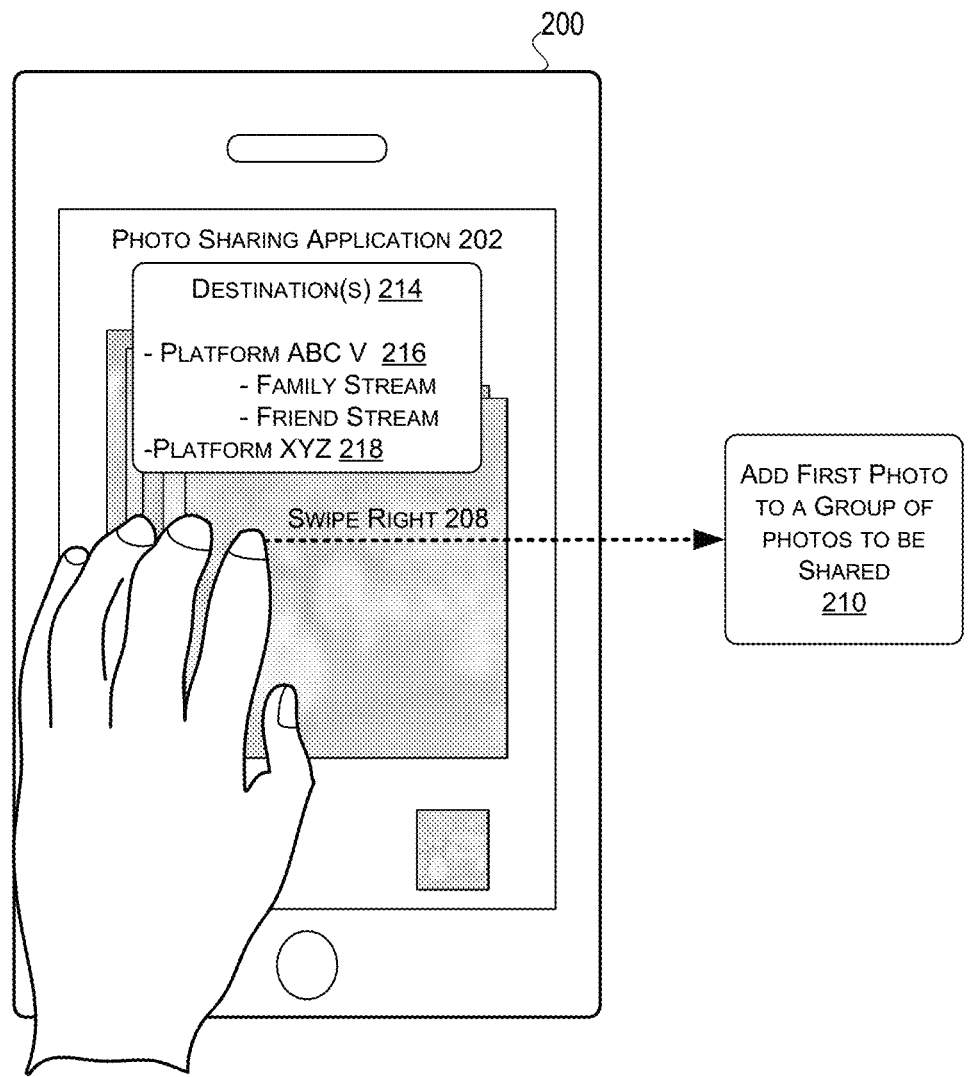
FIG. 2B illustrates how a network destination to which selected photos are to be shared can be selected, from a list of network destinations, in association with the swipe gesture illustrated in FIG. 2A.

FIG. 2B illustrates how a network destination to which selected photos are to be shared can be selected, from a list of network destinations 214, in association with the swipe right gesture 208 illustrated in FIG. 2A. In this example, the photo sharing application 202 is configured to display the list 214 in association with the first swiped photo that is selected for sharing. The network destinations on the list 214 may be registered by the photo sharing application 202 and may comprise different platforms and/or different media streams. For instance, and as shown, the user can select a family or friend photo stream that is part of a first platform (e.g., "platform ABC" 216). Alternatively, the user can select "platform XYZ" 218 as the network destination.

In an alternative embodiment, the network destination to which photos are to be shared may be a preselected network destination determined based on user input received before the photos are arranged in the stacked configuration. For instance, the photo sharing application 202 can present the user with the list of network destinations 214 to which photos can be sent, and the user can make a selection from the list before the photos are arranged in the stacked configuration 206.

Figure 2C:
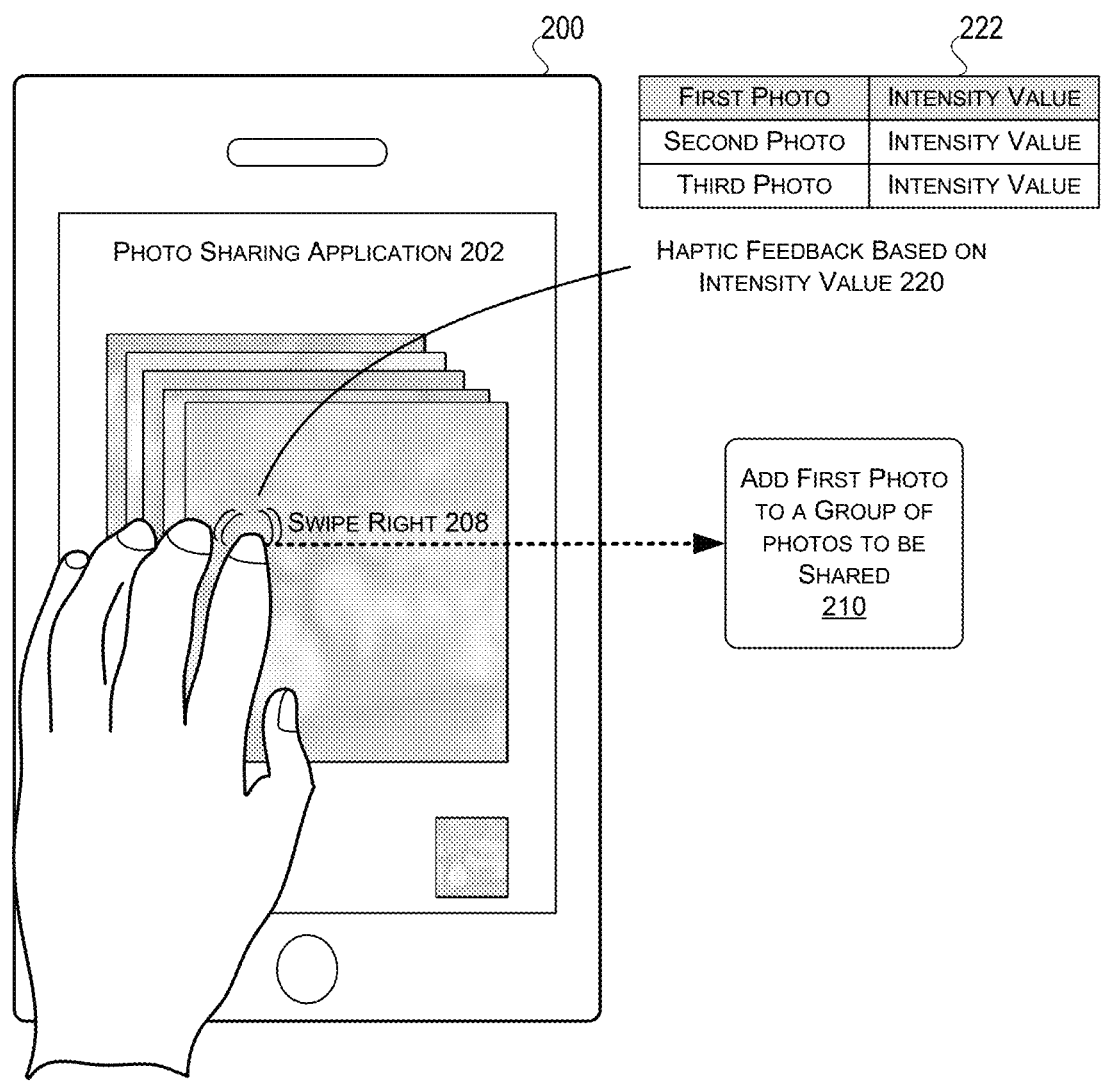
FIG. 2C illustrates how haptic feedback that provides a sense of accumulation can be provided in response to the example swipe gesture illustrated in FIG. 2A.

FIG. 2C illustrates how haptic feedback that provides a sense of accumulation can be provided in response to the example swipe gesture illustrated in FIG. 2A. As shown by the lines around the input mechanism, the smartphone device 200 is configured to provide haptic feedback, by way of the haptic feedback mechanism 110, based on an intensity value 220. An operating system of the smartphone device 200 enables the feedback signal generating module 136 to pass the intensity value to the haptic feedback mechanism 110 so the user can experience the haptic feedback. The feedback signal generating module 136 may maintain a table 222 that maps a number of selected photos (e.g., first photo, second photo, third photos, etc.), up to the maximum number of photos 134 allowed for sharing, to different intensity values that increase as the number of selected photos increases. In this way, the haptic feedback becomes more intense (e.g., stronger) as the number of selected photos increases, thereby providing a sense of accumulation to the user.

Figure 2D:
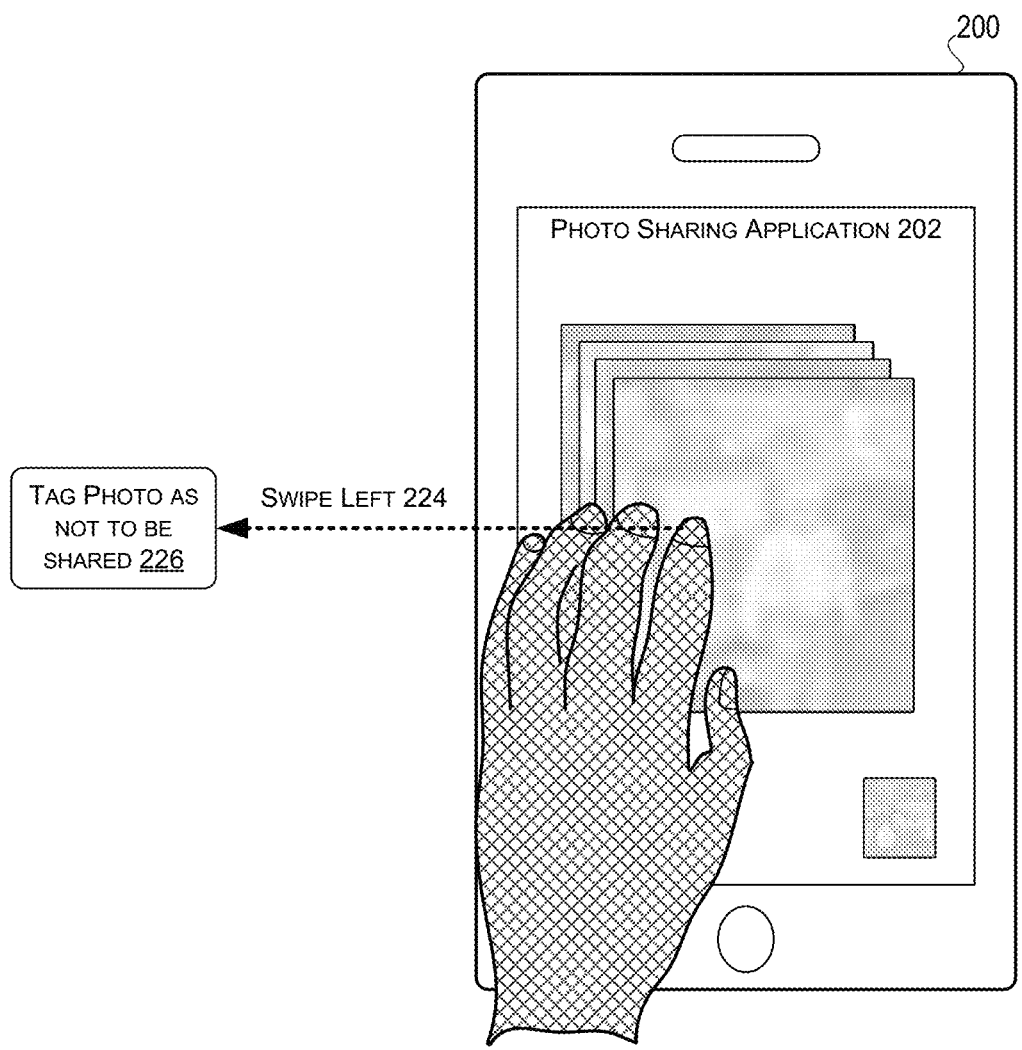
FIG. 2D illustrates an example swipe gesture that can communicate a user intent to not select a photo for sharing.

After a directional swipe occurs, such as the one illustrated in FIGS. 2A-2C, the next photo in the stacked configuration is displayed on top for a next directional swipe, as shown in FIG. 2D. In the example of FIG. 2D, the user 126 swipes to the left 224 to communicate a user intent to not select the photo for sharing. In various examples, swiping in a direction associated with a user intent to not share the photo causes the photo sharing application 202 to apply a tag to, or insert a tag into, metadata associated with a photo 226. The tag indicates that the photo has been reviewed by the user 126 for sharing purposes and that the user 126 has decided the photo is one to not share with other users (e.g., the user intends to keep the photo private for any one of various reasons).

Figure 2E:
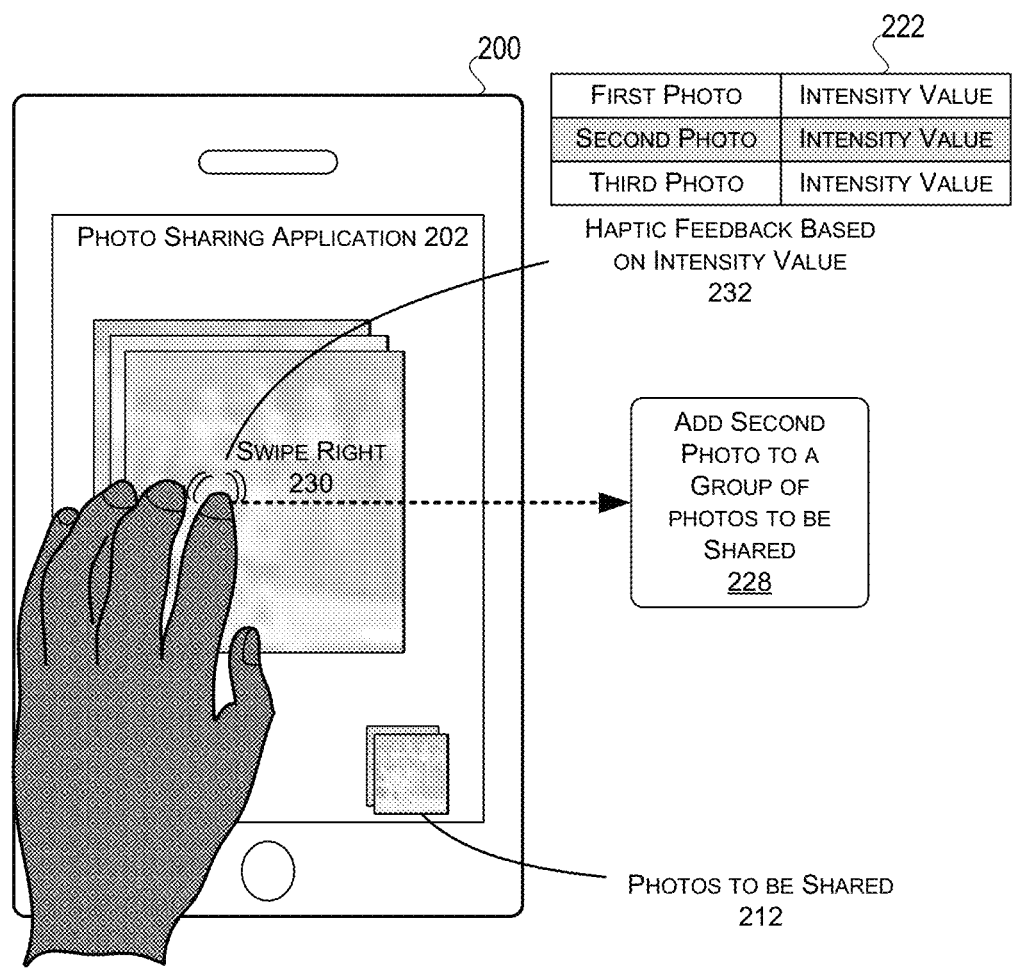
FIG. 2E illustrates an example swipe gesture that can communicate a user intent to select another photo to be shared to a network destination in a single sharing instance, and how haptic feedback that provides a sense of accumulation can be provided in response to the example swipe gesture.

This process of moving a next photo to the top-most position on the stack is repeated after each photo is reviewed for sharing purposes (e.g., swiped left or right). Accordingly, FIG. 2E illustrates the next photo is the second photo added to the group of photos to be shared 228 based on a user swipe to the right 230. Based on this swipe 230, the second photo can be visually added to the stack 212 similar to the discussion of the first photo with respect to FIG. 2A. Moreover, based on this swipe 230, the feedback signal generating module 136 uses the table 222 to determine an intensity value based on the second photo being selected for sharing. This intensity value is passed to the haptic feedback mechanism 110 so the smartphone device 200 can provide haptic feedback 232 that is more intense than haptic feedback 220 discussed above with respect to FIG. 2C.

This process of displaying a new photo on the top of the stacked configuration so it can be swiped right or left is repeated until all the photos in the stacked configuration have been displayed to the user, reviewed by the user, and swiped by the user. Alternatively, this process is repeated until a maximum number of photos 134 capable of being shared in a single sharing instance has been reached.

Figure 3:
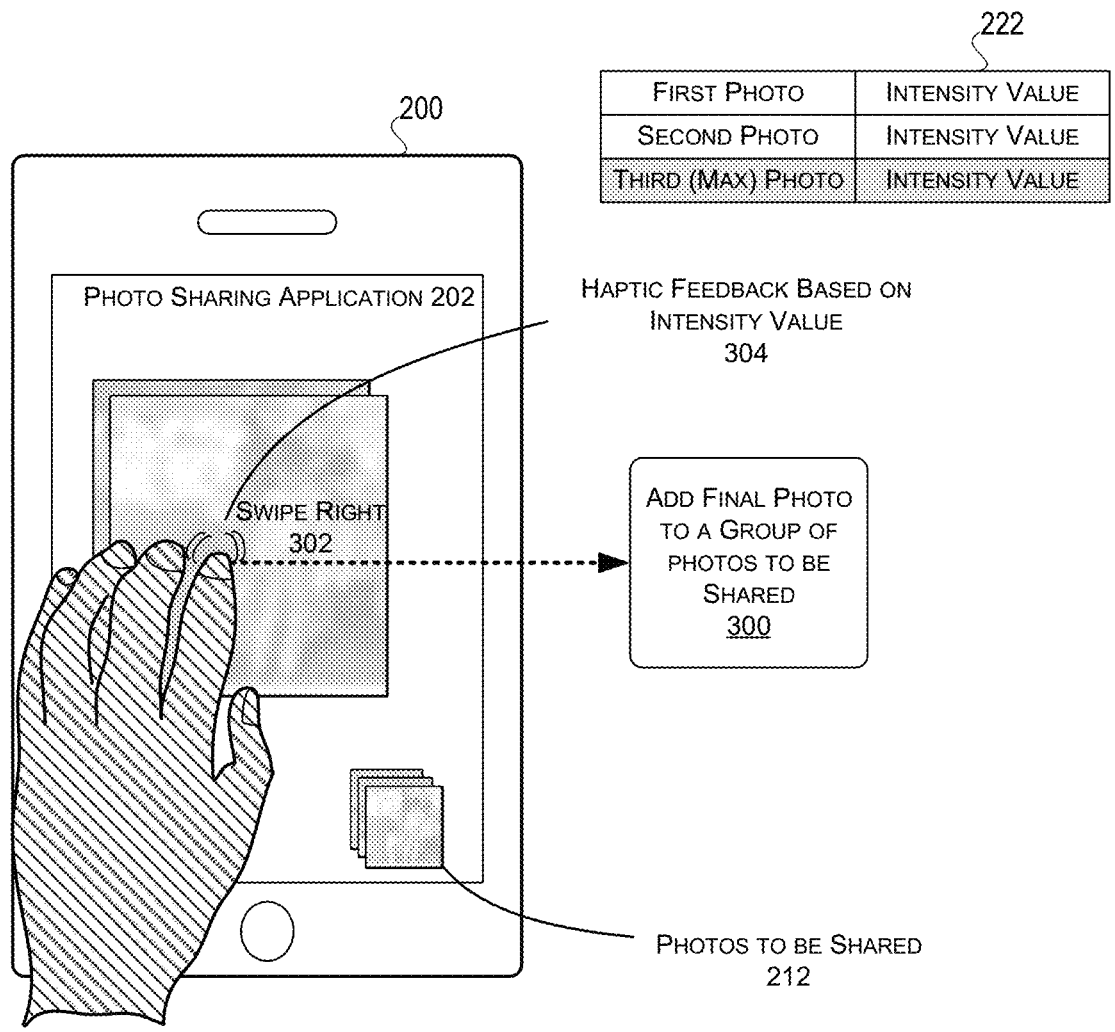
FIG. 3 illustrates an example swipe gesture that can communicate a user intent to select a photo to be shared to a network destination in a single sharing instance, and how haptic feedback that provides a sense of accumulation can be provided in response to the example swipe gesture.

For instance, FIG. 3 illustrates an example where the user has reached the maximum number of photos 134 when a final photo is added to the group of photos to be shared 300 based on a user swipe to the right 302. Based on this swipe 302, the final photo can be visually added to the stack 212 similar to the discussion of the previous photos with respect to FIGS. 2A and 2E. Moreover, based on this swipe 302, the feedback signal generating module 136 uses the table 222 to determine an intensity value based on the third and final photo being selected for sharing. This intensity value is passed to the haptic feedback mechanism 110 so the smartphone device 200 can provide haptic feedback 304 that is more intense than the haptic feedback 220, 232 discussed above with respect to FIG. 2C and FIG. 2E.

In some instances, the feedback signal generating module 136 can use a first type or composition of haptic feedback (e.g., first texture and/or a first sound) for photos that are selected before the maximum number is reached. However, when the user reaches the predefined maximum number of photos as a result of the final photo being added, the feedback signal generating module 136 can use a second type or composition of haptic feedback (e.g., a second texture and/or a second sound) that is different than the first type or composition of haptic feedback in order to more clearly indicate to the user that no more accumulation is possible because the predefined maximum number has been reached. Consequently, the haptic feedback 304 in FIG. 3 may be more intense and/or of a different type or composition compared to earlier instances of haptic feedback.

FIGS. 2A-2E and 3 illustrate that first and second swipe directions can be respectively associated with a first user intent to share a photo to a network destination and a second user intent to not share the photo with the network destination. However, the item sharing application 116 can be configured to implement any number of different swipe directions that correspond to a number of different user intents. For instance, the item sharing application 116 can associate a third swipe direction (e.g., upwards from the touch-screen display or downwards from the touch-screen display) with a third user intent to share the photo with another network destination that is different than the network destination associated with the first swipe direction. In another example, a swipe direction can be associated with an instruction to delete the photo from the user device 102 (e.g., to save storage space). Thus, different swipe directions (e.g., up, down, left, right, upper left, upper right, lower left, lower right, etc.) can be associated with different user intents and/or network destinations.

In another embodiment, the item sharing application 116 executing on the mobile device 102 is configured to receive, as the user input, a continuous user gesture that traverses a set of photos which are laid out in a grid configuration. Again, to initiate the techniques described herein, a user may open the item sharing application 116 and select a sharing user interface control element to share photos. In response, the item sharing application 116 is configured to access photos stored on a mobile device and configure the photos into a grid configuration to be presented on the touch-screen display.

Figure 4A:
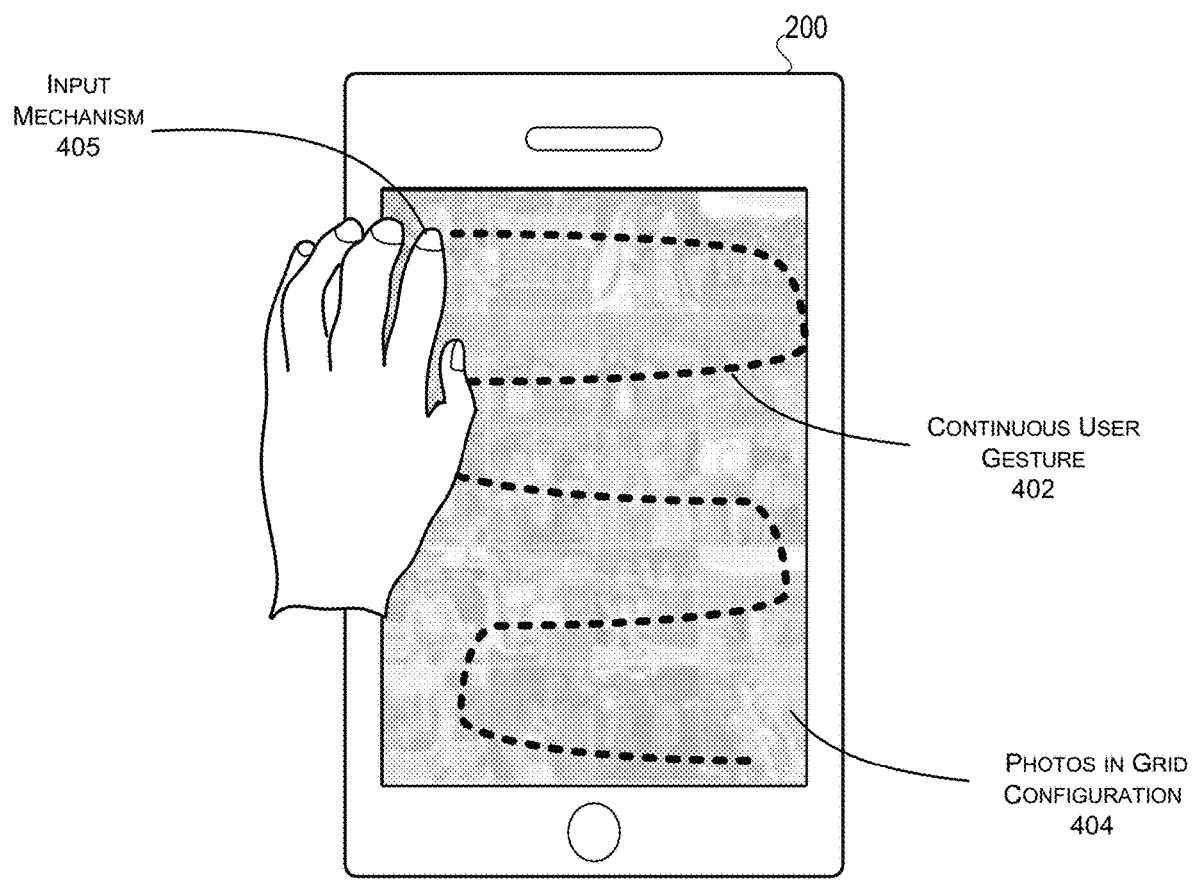
FIG. 4A illustrates an example continuous user gesture that can communicate a user intent to select photos to be shared to a network destination in a single sharing instance.

FIG. 4A illustrates an example continuous user gesture 402 (represented by the dashed line) that, as described below, can communicate a user intent to select photos to be shared to a network destination in a single sharing instance. The photos are laid out in a grid configuration 404 where, for example, a set of recommended photos are arranged into columns and/or rows that fit within a single screen. The user gesture 402 is continuous based on the maintenance of physical contact, or touch, between the input mechanism 405 (e.g., a finger, a thumb, a digital pen, a stylus, etc.) and the touch-screen display as the input mechanism 405 traverses or moves across various positions on the touch-screen display where the photos (e.g., thumbnail versions) are displayed.

Figure 4B:
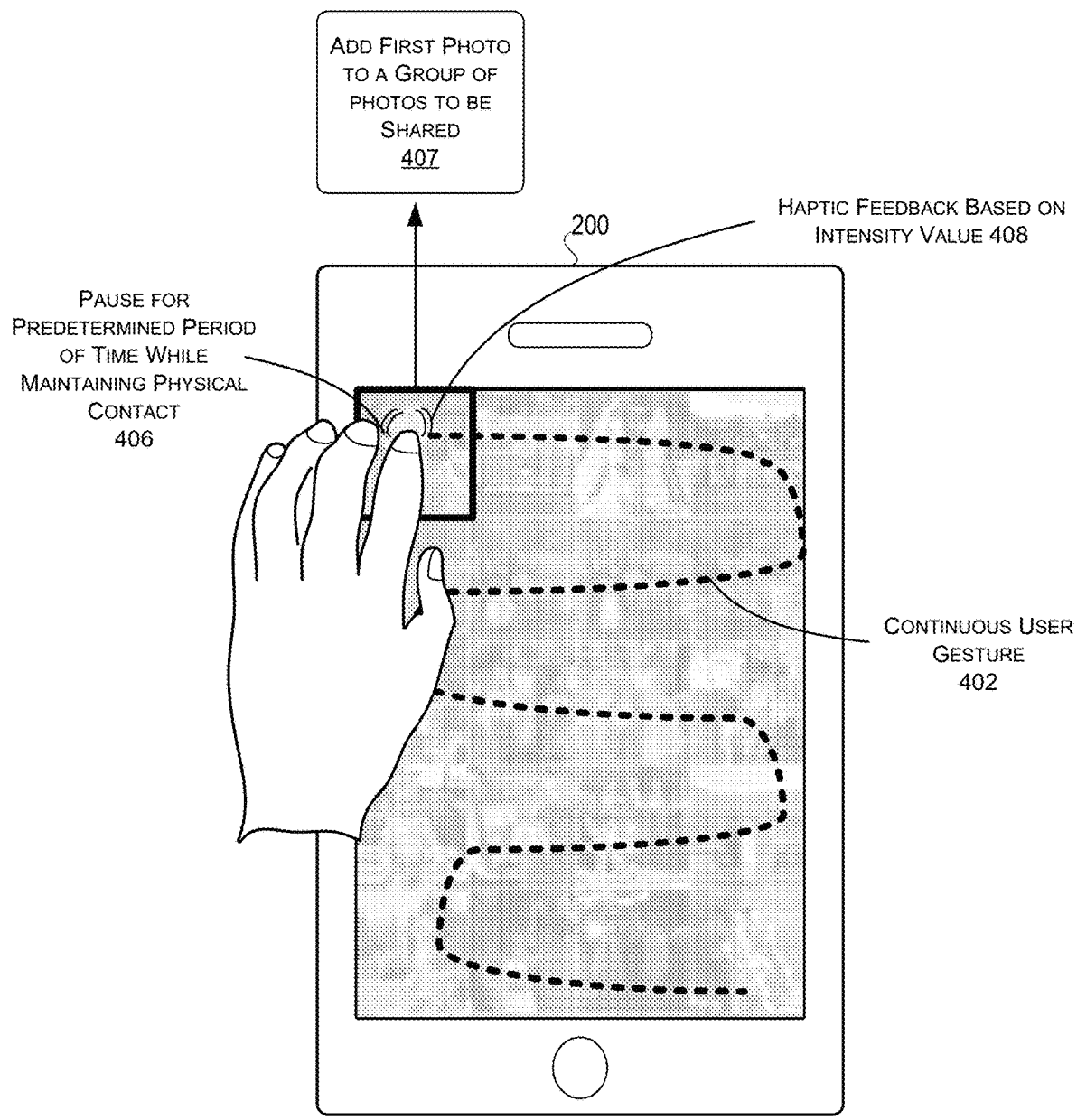
FIG. 4B illustrates how a pause in the example continuous user gesture of FIG. 4A can communicate a user intent to select an individual photo to be shared to a network destination in a single sharing instance.

FIG. 4B illustrates a position of the input mechanism 405 early in the continuous gesture 402. As shown, the user is touching the photo in the upper left corner. When performing the continuous user gesture 402, whether or not the user pauses on a particular photo reflects a user intent with regard to whether or not the particular photo is to be shared to a network destination. Looking at FIG. 4B, the user intends to share the photo in the upper left corner in a single sharing instance. To communicate this intent, the user pauses the touch input on the photo for a predetermined period of time 406 (e.g., one second, two seconds, etc.), but does not break physical contact with the touch-screen display. In other words, the movement of the continuous user gesture 402 is halted or interrupted. This pause signals a user intent to add the underlying photo to the group of photos to be shared to a network destination 407.

Similar to the discussion above with respect to FIG. 2C, the feedback signal generating module 136 can pass an intensity value to the haptic feedback mechanism 110 so the user can experience the haptic feedback 408 in the grid configuration as well. That is, the feedback signal generating module 136 can access the table 222 that maps a number of selected photos (e.g., first photo, second photo, third photos, etc.), up to the maximum number of photos 134 allowed for sharing, to different intensity values that increase as the number of selected photos increases. In this way, the haptic feedback becomes more intense (e.g., stronger) as the number of photos selected in the grid configuration increases, thereby providing a sense of accumulation to the user.

Figure 4C:
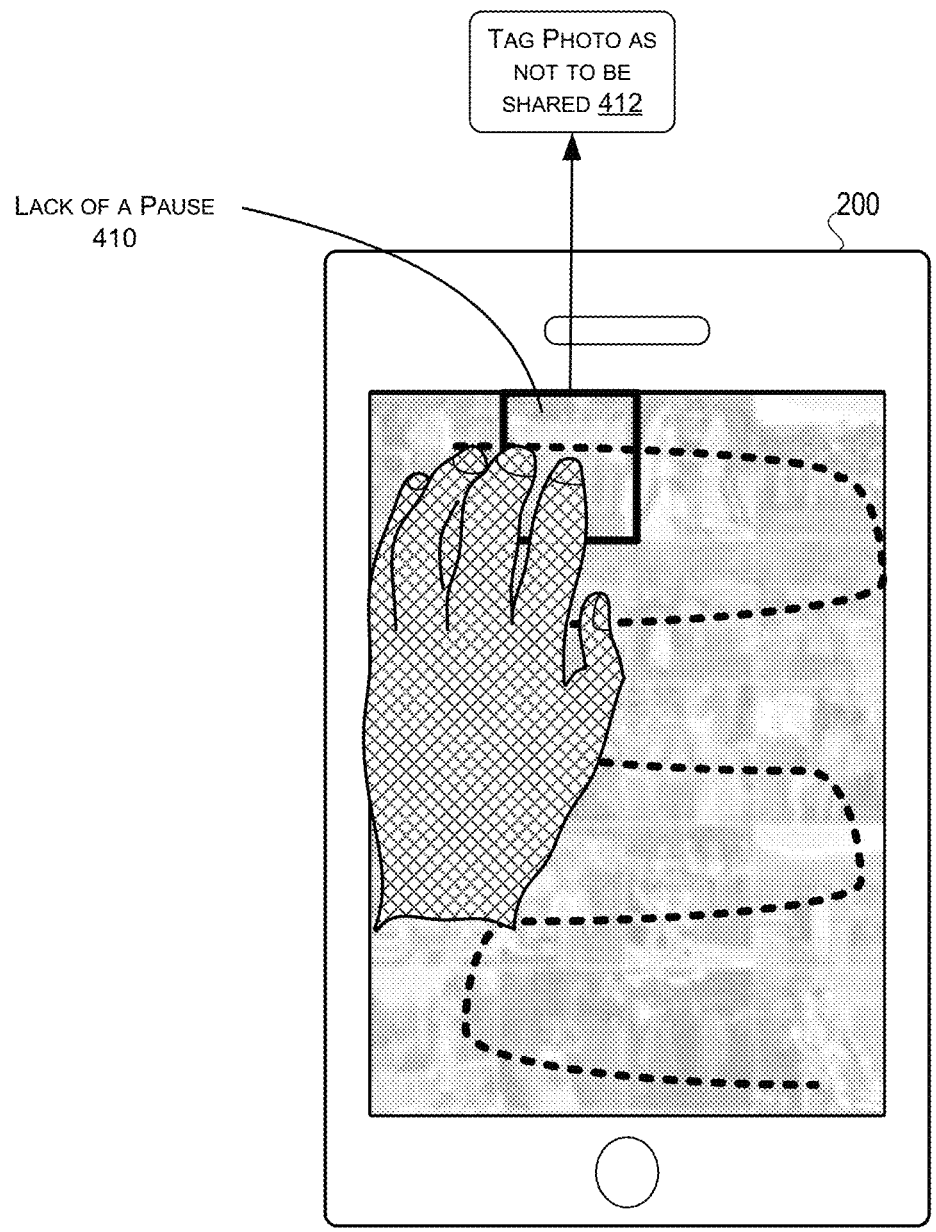
FIG. 4C illustrates how a lack of a pause in the example continuous user gesture of FIG. 4A can communicate a user intent to not select an individual photo to be shared to a network destination in a single sharing instance.
Figure 4D:
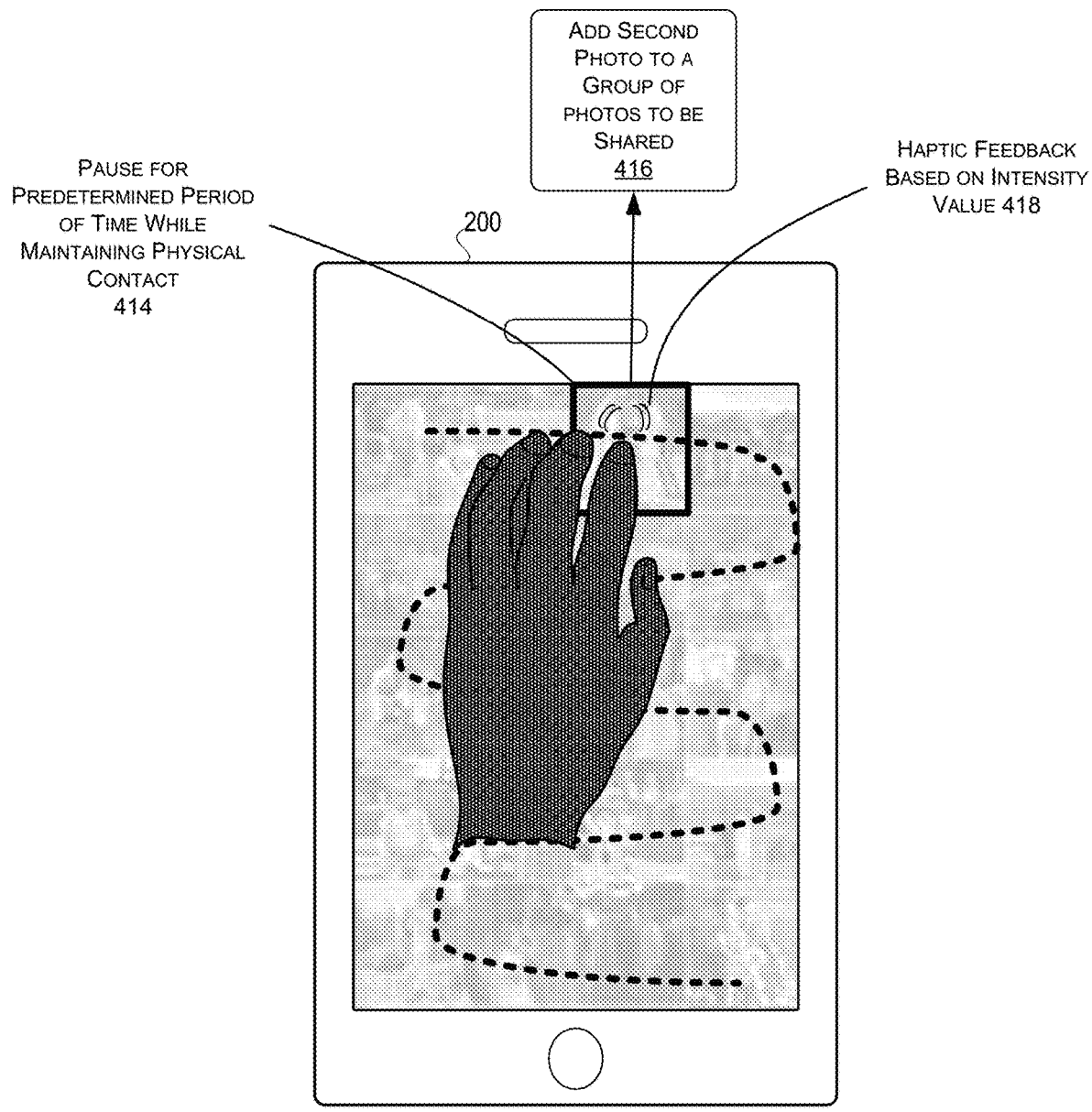
FIG. 4D illustrates how a pause in the example continuous user gesture of FIG. 4A can communicate a user intent to select another individual photo to be shared to a network destination in a single sharing instance.
Figure 5:
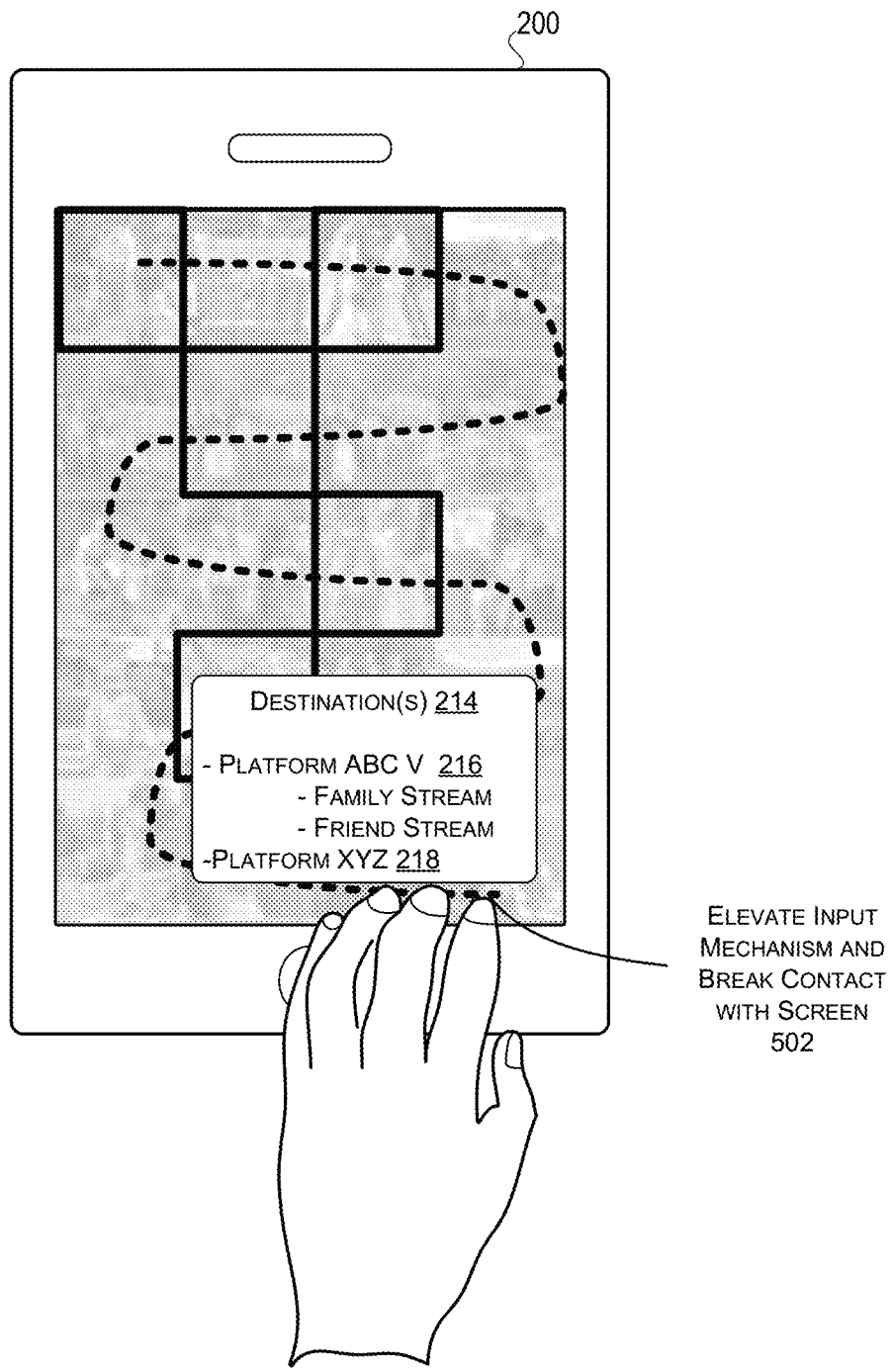
FIG. 5 illustrates how the example continuous user gesture can end so that a network destination can be selected from a displayed list of network destinations.

After the selection of FIG. 4B is made and confirmed using the haptic feedback, the user can move the continuous user gesture to the next photo in the grid configuration, as shown in FIG. 4C. The user fails to pause on the photo in FIG. 4C. That is, the movement of the continuous user gesture traverses uninterrupted across the photo in FIG. 4C to the next photo in the top row as shown in FIG. 4D. Looking back at FIG. 4C, this lack of a pause 410 in the continuous user gesture can communicate a user intent to not select the underlying photo to be shared to a network destination in a single sharing instance. Rather, the underlying photo is tagged as a photo the user does not intend to share 412.

FIG. 4D illustrates how the user selects another photo to be added to the group of photos to be shared based on pausing on the underlying photo for a predetermined period of time 414. Again, this pause signals a user intent to add the underlying photo, as the second photo, to the group of photos to be shared to a network destination 416. Again, the feedback signal generating module 136 uses the table 222 to determine an intensity value based on the second photo being selected for sharing. This intensity value is passed to the haptic feedback mechanism 110 so the smartphone device 200 can provide haptic feedback 418 that is more intense than haptic feedback 408 discussed above with respect to FIG. 4B.

Similar to the discussion of FIGS. 4B-4D, and as illustrated by the continuous user gesture 402, the user can traverse the photos displayed in the grid configuration 404 and pause on the ones they intend to share and merely continue the user gesture uninterrupted over the ones they intend not to share. When the user has selected all the photos they wish to add (as illustrated by the five bolded boxes in FIG. 5), the user can elevate 502 the input mechanism 405 to break contact between the input mechanism 405 and the touch-screen display (e.g., raise their finger off the touch-screen display) for a predetermined period of time (e.g., one second, two seconds, etc.).

This break in contact can configure the item application sharing application 116 to display a confirmation UI element at the position on the screen where the input mechanism breaks physical contact so that the user can confirm that the selection process has ended. Additionally, this break in contact may cause the item sharing application 116 to display a list of network destinations 214 (similar to the discussion above with respect to FIG. 2B) at the position on the touch-screen display where the input mechanism breaks physical contact so that the user can select a network destination to which the selected photos are to be shared.

In a further embodiment, the directional swipe-based gestures associated with different user intents, as discussed above, can alternatively be implemented in association with the grid configuration. That is, the user can place the input mechanism on each of the photos in the grid configuration and swipe in various directions in order to signal the different user intents with regard to sharing a photo.

Figure 6:
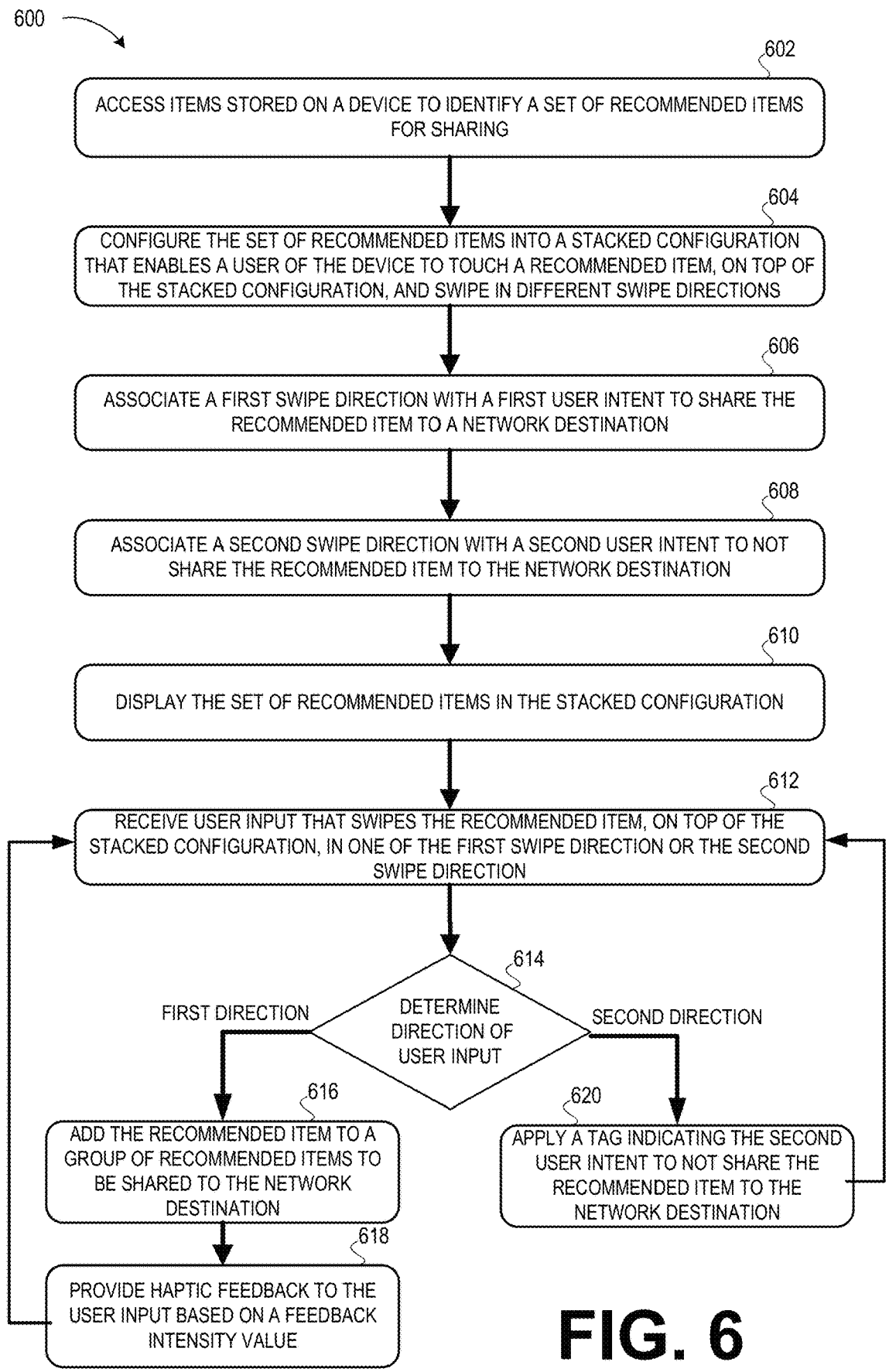
FIG. 6 is a flow diagram illustrating aspects of a sample routine that displays items in a stacked configuration so that user input with respect to whether a user intends to share an item can be received.
Figure 7:
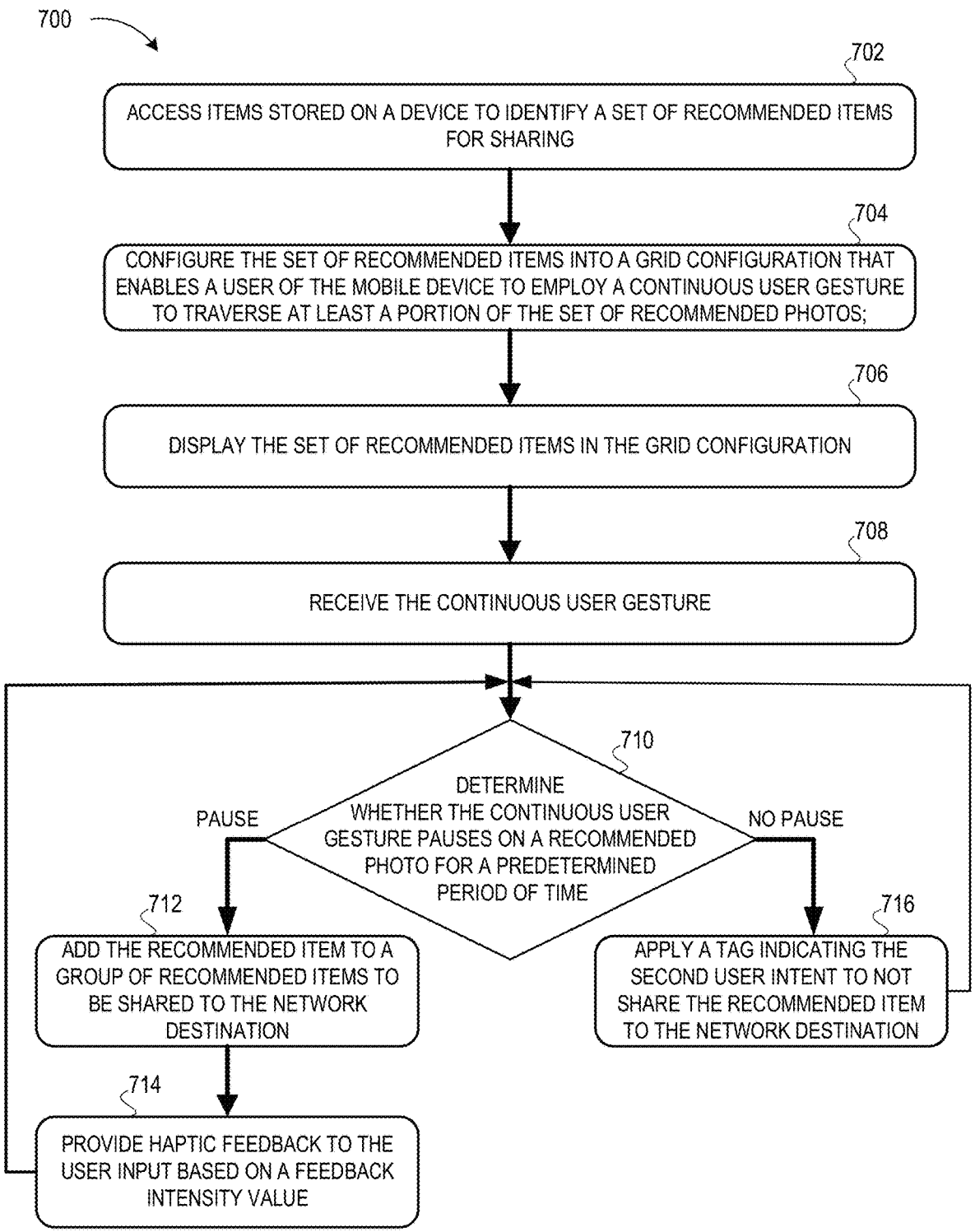
FIG. 7 is a flow diagram illustrating aspects of a sample routine that displays items in a grid configuration so that user input with respect to whether a user intends to share an item can be received.

FIGS. 6 and 7 are flow diagrams illustrating routines describing aspects of the present disclosure. In various examples, operations of the routines can be performed by components of the user device (e.g., the item sharing application 116, an operating system, the touch-screen display, the haptic feedback mechanism, etc.). The logical operations described herein with regards to FIGS. 6 and 7 can be implemented (1) as a sequence of computer implemented acts or program modules running on a computing device and/or (2) as interconnected machine logic circuits or circuit modules within a computing device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations of the routines can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustrations may refer to components of the figures, it can be appreciated that the operations of the routines may be also implemented in many other ways. For example, the routines may be implemented, at least in part, by another remote computer, processor, or circuit. In the examples described herein, one or more modules of a computing system can receive and/or process the data. Any service, circuit, or application suitable for providing the techniques disclosed herein can be used in the operations described.

With reference to FIG. 6, the routine 600 begins at operation 602 where items stored on a device are accessed to identify a set of recommended items for sharing. At operation 604, the set of recommended items is configured into a stacked configuration that enables a user of the device to touch a recommended item, on top of the stacked configuration, and swipe in different swipe directions.

At operation 606, a first swipe direction is associated with a first user intent to share the recommended item to a network destination. As described above, the network destination may implement a policy in which a predefined maximum number of items can be shared in a single sharing instance. At operation 608, a second swipe direction is associated with a second user intent to not share the recommended item to the network destination.

At operation 610, the set of recommended items is displayed in the stacked configuration. At operation 612, user input that swipes the recommended item, on top of the stacked configuration, in one of the first swipe direction or the second swipe direction is received.

At 614, it is determined what direction in which the user input swipes. In an event the user input swipes the recommended item in the first swipe direction, the routine proceeds to operation 616 where the recommended item is added to a group of recommended items to be shared to the network destination in the single sharing instance. At operation 618, haptic feedback is provided to the user input based on a feedback intensity value. As described above, the feedback intensity value can be determined based on a number of recommended items that have been added to the group of recommend items. This provides a sense of accumulation, to the user of the device, with respect to the predefined maximum number of items that can be shared in the single sharing instance.

Going back to operation 614, in an event the user input swipes the recommended item in the second swipe direction, the routine proceeds to operation 620 where a tag is applied to the recommended item. The tag indicates a second user intent to not share the recommended item to the network destination.

FIG. 6 illustrates arrows from operations 618 and 620 that loop pack up to operation 612 to show that once an item is swiped and removed from the stack, the next item is displayed on top of the stack and the selection process continues until all the recommended items have been reviewed or until the predefined maximum number of items has been reached.

With reference to FIG. 7, the routine 700 begins at operation 702 where items stored on a device are accessed to identify a set of recommended items for sharing. At operation 704, the set of recommended items is configured into a grid configuration that enables a user of the device to employ a continuous user gesture to traverse at least a portion of the set of recommended items.

At operation 706, the set of recommended items is displayed in the grid configuration. At operation 708, the continuous user gesture is received. While receiving the continuous user gesture, operation 710 determines whether the continuous user gesture pauses on a recommended photo for a predetermined period of time. As described above, the pause for the predetermined period of time signals a first user intent to share the recommend item to a network destination.

In an event the continuous user gesture pauses on the recommended item for the predetermined period of time, the routine proceeds to operation 712 where the recommend item is added to a group of recommended items to be shared to the network destination in the single sharing instance. At operation 714, haptic feedback is provided to the user input (e.g., after the predetermined time period for the pause expires) based on a feedback intensity value. As described above, the feedback intensity value can be determined based on a number of recommended items that have been added to the group of recommend items. This provides a sense of accumulation, to the user of the device, with respect to the predefined maximum number of items that can be shared in the single sharing instance.

Going back to operation 710, in an event the continuous user gesture does not pause on the recommended item for the predetermined period of time, the routine proceeds to operation 716 where a tag is applied to the recommended item. The tag indicates a second user intent to not share the recommended item to the network destination.

FIG. 7 illustrates arrows from operations 714 and 716 that loop pack up to operation 710 to show that once the continuous user gesture has moved passed an item then the next item in the grid configuration, along the continuous user gesture is evaluated. This occurs until all the recommended items have been traversed by the continuous user gesture or until the predefined maximum number of items has been reached.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

Figure 8:
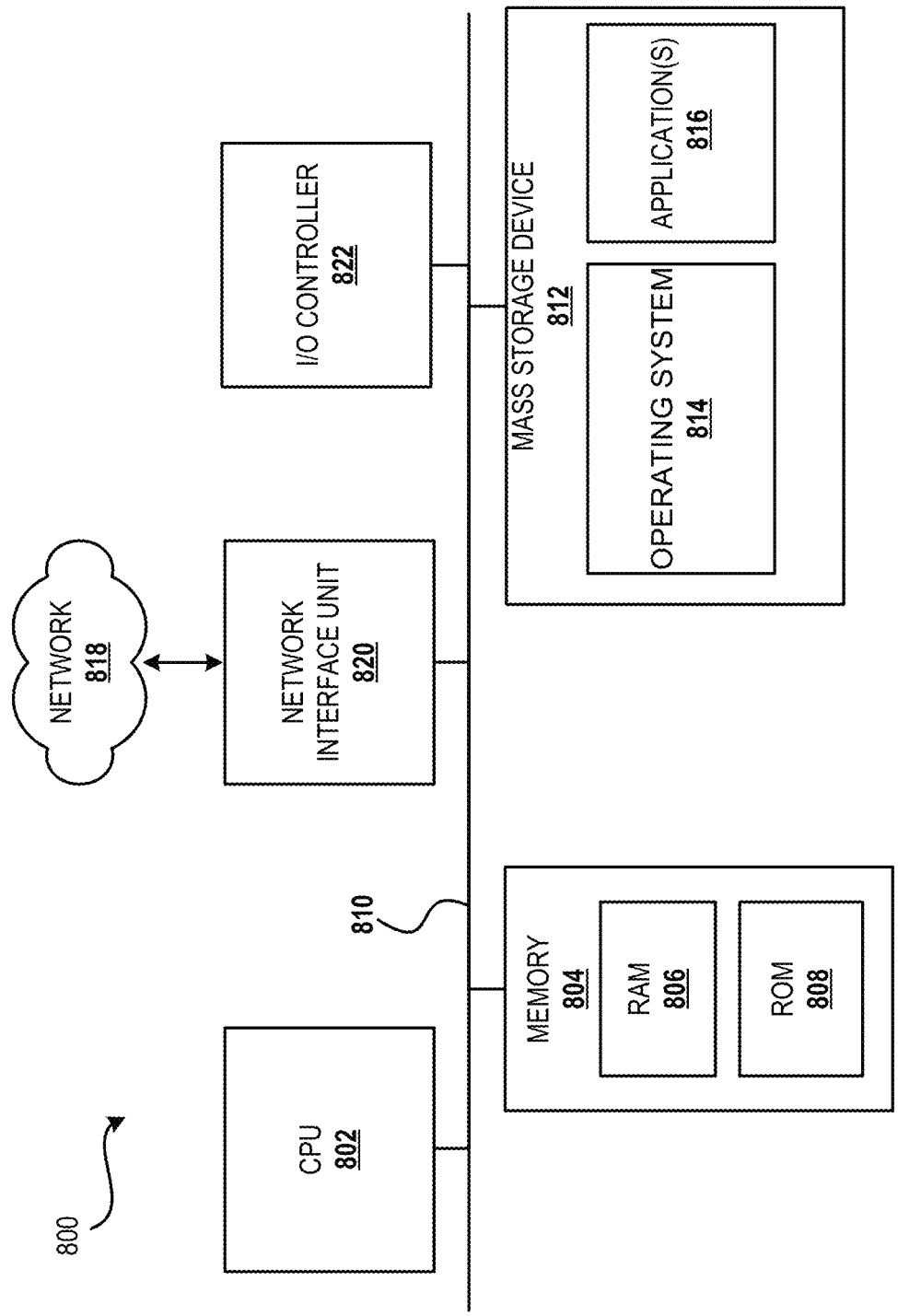
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a device, such as the user device 102 (e.g., a smartphone device, a tablet device, etc.), capable of executing computer instructions (e.g., a module or a program component described herein). The computer architecture 800 illustrated in FIG. 8 includes processing unit(s) 802, a system memory 804, including a random-access memory 806 ("RAM") and a read-only memory ("ROM") 808, and a system bus 810 that couples the memory 804 to the processing unit(s) 802.

Processing unit(s), such as processing unit(s) 802, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 800, such as during startup, is stored in the ROM 808. The computer architecture 800 further includes a mass storage device 812 for storing an operating system 814, application(s) 816 (e.g., item sharing application 116), and other data described herein.

The mass storage device 812 is connected to processing unit(s) 802 through a mass storage controller connected to the bus 810. The mass storage device 812 and its associated computer-readable media provide non-volatile storage for the computer architecture 800. Although the description of computer-readable media contained herein refers to a mass storage device, it should be appreciated by those skilled in the art that computer-readable media can be any available computer-readable storage media or communication media that can be accessed by the computer architecture 800.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 800 may operate in a networked environment using logical connections to remote computers through the network 818. The computer architecture 800 may connect to the network 818 through a network interface unit 820 connected to the bus 810. The computer architecture 800 also may include an input/output controller 822 for receiving and processing input from a number of other devices, including a keyboard, mouse, touch, or electronic stylus or pen. Similarly, the input/output controller 822 may provide output to a display screen, speaker, or other type of output device.

It should be appreciated that the software components described herein may, when loaded into the processing unit(s) 802 and executed, transform the processing unit(s) 802 and the overall computer architecture 800 from a general-purpose computing system into a special-purpose computing system customized to facilitate the functionality presented herein. The processing unit(s) 802 may be constructed from any number of transistors or other discrete circuit elements, which may individually or collectively assume any number of states. More specifically, the processing unit(s) 802 may operate as a finite-state machine, in response to executable instructions contained within the software modules disclosed herein. These computer-executable instructions may transform the processing unit(s) 802 by specifying how the processing unit(s) 802 transition between states, thereby transforming the transistors or other discrete hardware elements constituting the processing unit(s) 802.

Figure 9:
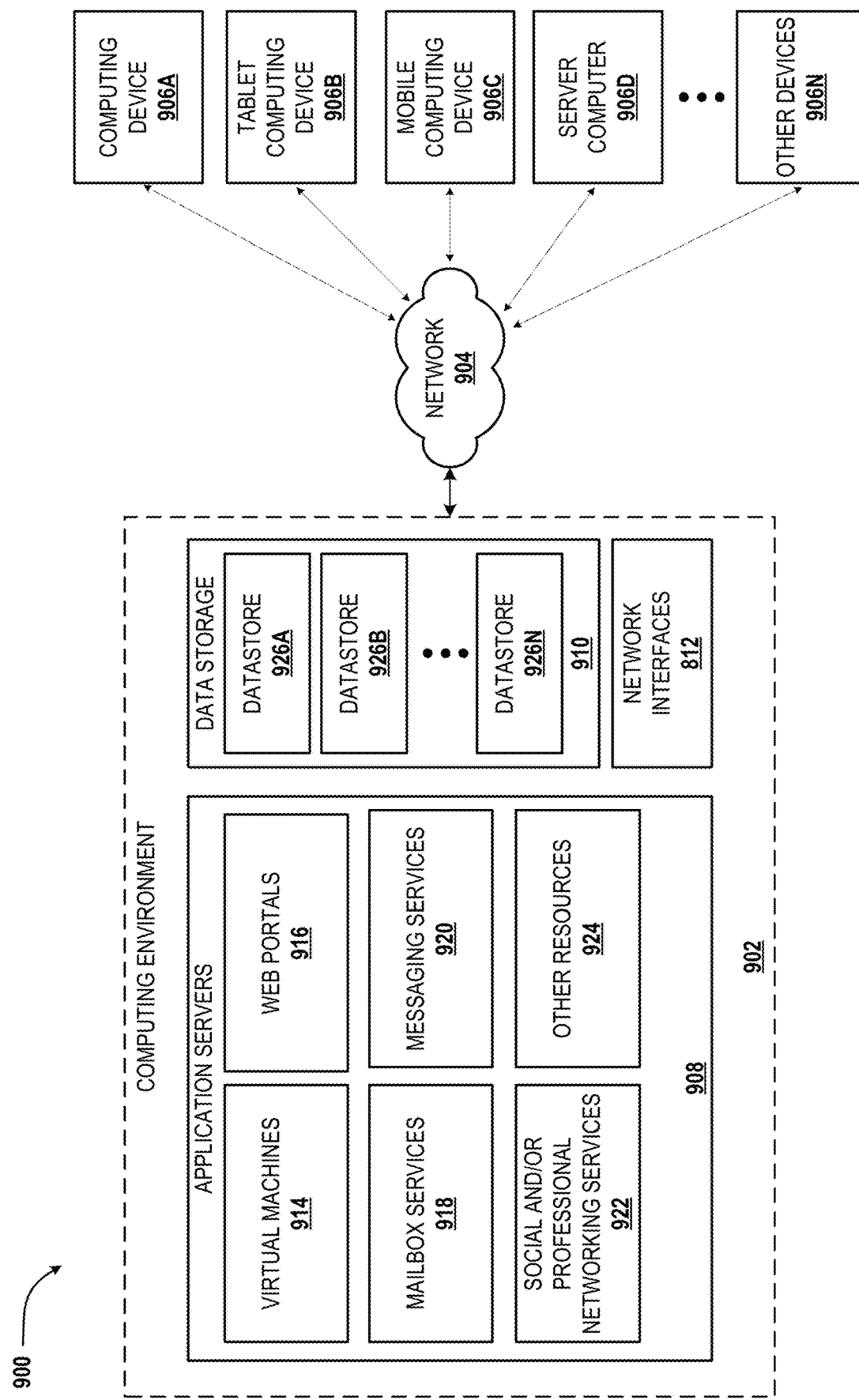
FIG. 9 is a diagram illustrating a distributed computing environment capable of implementing aspects of the techniques and technologies presented herein.

FIG. 9 depicts an illustrative distributed computing environment 900 capable of executing the software components described herein. Thus, the distributed computing environment 900 illustrated in FIG. 9 can be utilized to execute any aspects of the software components presented herein. For example, the distributed computing environment 900 can be utilized to execute aspects of the software components described herein.

Accordingly, the distributed computing environment 900 can include a computing environment 902 operating on, in communication with, or as part of the network 904. The network 904 can include various access networks. One or more client devices 906A-906N (hereinafter referred to collectively and/or generically as "clients 906" and also referred to herein as computing devices 906) can communicate with the computing environment 902 via the network 904. In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902.

In various examples, the computing environment 902 includes servers 908, data storage 910, and one or more network interfaces 912. The servers 908 can host various services, virtual machines, portals, and/or other resources. In the illustrated configuration, the servers 908 host virtual machines 914, Web portals 916, mailbox services 918, storage services 920, and/or, social networking services 922. As shown in FIG. 9 the servers 908 also can host other services, applications, portals, and/or other resources ("other resources") 924.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more servers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the servers 908 and/or other data. That is, the datastores 926 also can host or store web page documents, word documents, presentation documents, data structures, algorithms for execution by a recommendation engine, and/or other data utilized by any application program. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the computing devices and the servers. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing the techniques disclosed herein, among other aspects.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses.

Example Clause A, a device comprising: one or more processing units; and computer storage media having executable instructions that, when executed by the one or more processing units, cause the device to perform operations comprising: accessing photos stored on a mobile device to identify a set of recommended photos for sharing; configuring the set of recommended photos into a stacked configuration that enables a user of the mobile device to touch a recommended photo, on top of the stacked configuration, and swipe in different swipe directions; associating a first swipe direction with a first user intent to share the recommended photo to a network destination, wherein the network destination implements a policy in which a predefined maximum number of photos can be shared in a single sharing instance; associating a second swipe direction with a second user intent to not share the recommended photo to the network destination; displaying the set of recommended photos in the stacked configuration; receiving user input that swipes the recommended photo, on top of the stacked configuration, in one of the first swipe direction or the second swipe direction; in an event the user input swipes the recommended photo in the first swipe direction: adding the recommended photo to a group of recommended photos to be shared to the network destination in the single sharing instance; and providing haptic feedback to the user input based on a feedback intensity value, wherein the feedback intensity value is determined based on a number of recommended photos that have been added to the group of recommend photos thereby providing an accumulation signal, to the user of the mobile device, with respect to the predefined maximum number of photos that can be shared in the single sharing instance; and in an event the user input swipes the recommended photo in the second swipe direction, applying a tag to the recommended photo, the tag indicating the second user intent to not share the recommended photo to the network destination.

Example Clause B, the device of Example Clause A, wherein the recommended photo is included in the set of recommended photos based on metadata that indicates the recommended photo has not been reviewed by the user for sharing purposes, and the operations further comprise updating the metadata for the recommended photo to reflect that the recommended photo has been reviewed by the user for sharing purposes in response to receiving the user input that swipes the recommended photo.

Example Clause C, the device of Example Clause A or Example Clause B, wherein the operations further comprise displaying a sharing control user interface element that, when activated, implements at least the accessing, the configuring, and the displaying.

Example Clause D, the device of any one of Example Clauses A through C, wherein the network destination comprises a preselected network destination determined based on additional user input received before configuring the set of recommended photos into the stacked configuration.

Example Clause E, the device of any one of Example Clauses A through C, wherein the network destination is selected, based on additional user input, from a list of network destinations that is displayed in association with a first photo that is added to the group of recommended photos.

Example Clause F, the device of any one of Example Clauses A through E, wherein the operations comprise associating a third swipe direction with a third user intent to share the recommended photo to another network destination that is different than the network destination.

Example Clause G, the device of any one of Example Clauses A through F, wherein the haptic feedback is a first type of haptic feedback, and the operations further comprise: determining that the predefined maximum number of photos that can be shared in the single sharing instance has been reached after a final recommended photo is added to the group of recommended photos; and providing a second type of haptic feedback in response to a corresponding user input that swipes the final recommended photo in the first swipe direction, the second type of haptic feedback indicating no more accumulation is possible.

Example Clause H, a method comprising: configuring, by one or more processing units, a set of items into a stacked configuration that enables a user of the mobile device to touch an item, on top of the stacked configuration, and swipe in different swipe directions; associating a first swipe direction with a first user intent to send the item to a network destination; associating a second swipe direction with a second user intent to not send the item to the network destination; displaying the set of items in the stacked configuration; receiving user input that swipes the item, on top of the stacked configuration, in one of the first swipe direction or the second swipe direction; in an event the user input swipes the item in the first swipe direction: adding the item to a group of items that is to be sent to the network destination; and providing haptic feedback to the user input based on a feedback intensity value, wherein the feedback intensity value increases as a number of items that have been added to the group of items increases thereby providing an accumulation signal to the user of the mobile device; and in an event the user input swipes the item in the second swipe direction, applying a tag to the item indicating the second user intent to not send the item to the network destination.

Example Clause I, the method of Example Clause H, wherein the network destination is selected, based on additional user input, from a list of network destinations that is displayed in association with a first item that is added to the group of recommended items.

Example Clause J, the method of Example Clause H or Example Clause I, wherein the network destination implements a policy that limits the number of items to be sent to a predefined maximum number of items, and wherein the haptic feedback is a first type of haptic feedback, the method further comprising: determining that the predefined maximum number of items has been reached after a final item is added to the group of items; and providing a second type of haptic feedback in response to a corresponding user input that swipes the final item in the first swipe direction, the second type of haptic feedback indicating no more accumulation is possible.

Example Clause K, the method of any one of Example Clauses H through J, wherein the set of items comprises a set of photos.

Example Clause L, a method comprising: configuring, by one or more processing units, a set of items into a grid configuration that enables a user of the mobile device to employ a continuous user gesture to traverse the set of items; displaying the set of items in the grid configuration; determining whether the continuous user gesture pauses on an item for a predetermined period of time, wherein the predetermined period of time signals a first user intent to send the item to a network destination; in an event the continuous user gesture pauses on the item for the predetermined period of time: adding the item to a group of items to be sent to the network destination; and providing haptic feedback based on a feedback intensity value, wherein the feedback intensity value increases as a number of items that have been added to the group of items increases thereby providing an accumulation signal to the user of the mobile device; in an event the continuous user gesture does not pause on the item for the predetermined period of time, applying a tag to the item indicating a second user intent to not send the item to the network destination.

Example Clause M, the method of Example Clause L, further comprising: determining that the continuous user gesture ends based on an elevation of an input mechanism that breaks physical contact with a display screen; in response to determining that the continuous user gesture ends, displaying a list of network destinations in association with a position on a display screen where the continuous user gesture ends; receiving user input that selects the network destination from the list of network destinations.

Example Clause N, the method of Example Clause L or Example Clause M, wherein the network destination implements a policy that limits the number of items to be sent to a predefined maximum number of items, and wherein the haptic feedback is a first type of haptic feedback, the method further comprising: determining that the predefined maximum number of items has been reached after a final item is added to the group of items; and providing a second type of haptic feedback in response to the continuous user gesture pausing on the final item for the predetermined period of time, the second type of haptic feedback indicating no more accumulation is possible.

Example Clause O, the method of any one of Example Clauses L through N, further comprising: determining that the continuous user gesture ends based on an elevation of an input mechanism that breaks physical contact with a display screen; in response to determining that the continuous user gesture ends, displaying a confirmation control user interface element in association with a position on a display screen where the continuous user gesture ends; and receiving user input, via the confirmation control user interface element, confirming a sharing experience has ended and no additional items are to be added to the group of items.

Example Clause P, the method of any one of Example Clauses L through O, further comprising displaying a sharing control user interface element that, when activated, implements at least the configuring and the displaying.

Example Clause Q, the method of any one of Example Clauses L through P, wherein the network destination comprises a preselected network destination determined based on additional user input received before configuring the set of items into the grid configuration.

Example Clause R, the method of any one of Example Clauses L through Q, further comprising accessing items stored on the mobile device to identify a set of items as ones to be recommended for sharing.

Example Clause S, the method of Example Clause R, wherein the set of items are ones that are recommended for sharing based on metadata that indicates an item has not been reviewed for sharing purposes, and the method further comprises updating the metadata for the item to reflect that the item has been reviewed for sharing purposes.

Example Clause T, the method of any one of Example Clauses L through S, wherein the set of items comprises a set of photos.

Example Clause U, a device comprising: one or more processing units; and computer storage media having executable instructions that, when executed by the one or more processing units, cause the device to perform operations comprising: accessing photos stored on a mobile device to identify a set of recommended photos for sharing; configuring the set of recommended photos into a grid configuration that enables a user of the mobile device to employ a continuous user gesture to traverse at least a portion of the set of recommended photos; displaying the set of recommended photos in the grid configuration; receiving the continuous user gesture; while receiving the continuous user gesture, determining whether the continuous user gesture pauses on a recommended photo for a predetermined period of time, wherein the pause for the predetermined period of time signals a first user intent to share the recommend photo to a network destination that implements a policy in which a predefined maximum number of photos can be shared in a single sharing instance; in an event the continuous user gesture pauses on the recommended photo for the predetermined period of time: adding the recommended photo to a group of recommended photos to be shared to the network destination in the single sharing instance; and providing haptic feedback based on a feedback intensity value, wherein the feedback intensity value is based on a number of recommended photos that have been added to the group of recommended photos thereby providing an accumulation signal, to the user of the mobile device, with respect to the predefined maximum number of photos that can be shared in the single sharing instance; and in an event the continuous user gesture does not pause on the recommended photo for the predetermined period of time, applying a tag to the recommended photo, the tag indicating a second user intent to not share the recommended photo to the network destination.

Example Clause V, the device of Example Clause U, wherein the operations further comprise: determining that the continuous user gesture ends based on an elevation of an input mechanism that breaks physical contact with a display screen; in response to determining that the continuous user gesture ends, displaying a confirmation control user interface element in association with a position on a display screen where the continuous user gesture ends; and receiving user input, via the confirmation control user interface element, confirming a sharing experience has ended and no additional recommended photos are to be added to the subset of recommended photos.

Example Clause W, the device of Example Clause V or Example Clause U, wherein the operations further comprise: determining that the continuous user gesture ends based on an elevation of an input mechanism that breaks physical contact with a display screen; in response to determining that the continuous user gesture ends, displaying a list of network destinations in association with a position on a display screen where the continuous user gesture ends; and receiving user input that selects the network destination from the list of network destinations.

Example Clause X, the device of any one of Example Clauses V through W, wherein the recommended photo is included in the set of recommended photos based on metadata that indicates the recommended photo has not been reviewed by the user for sharing purposes, and the operations further comprise updating the metadata for the recommended photo to reflect that the recommended photo has been reviewed by the user for sharing purposes in response to the continuous user gesture traversing the recommended photo.

Example Clause Y, the device of any one of Example Clauses V through X, wherein the network destination comprises a preselected network destination determined based on additional user input received before configuring the set of recommended photos into the grid configuration.

Example Clause Z, the device of any one of Example Clauses V through Y, wherein the haptic feedback is a first type of haptic feedback, and the operations further comprise: determining that the predefined maximum number of photos that can be shared in the single sharing instance has been reached after a final recommended photo is added to the group of recommended photos; and providing a second type of haptic feedback in response to the continuous user gesture pausing on the final recommended photo for the predetermined period of time, the second type of haptic feedback indicating no more accumulation is possible.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different directions, two different user intents, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A device comprising:
 one or more processing units; and
 computer storage media having executable instructions that, when executed by the one or more processing units, cause the device to perform operations comprising:
  accessing photos stored on a mobile device to identify a set of recommended photos for sharing;
  configuring the set of recommended photos into a stacked configuration that enables a user of the mobile device to touch a recommended photo, on top of the stacked configuration, and swipe in different swipe directions;
  associating a first swipe direction with a first user intent to share the recommended photo to a network destination, wherein the network destination implements a policy in which a predefined maximum number of photos can be shared in a single sharing instance;

associating a second swipe direction with a second user intent to not share the recommended photo to the network destination;

displaying the set of recommended photos in the stacked configuration;

receiving user input that swipes the recommended photo, on top of the stacked configuration, in one of the first swipe direction or the second swipe direction;

in an event the user input swipes the recommended photo in the first swipe direction:

adding the recommended photo to a group of recommended photos to be shared to the network destination in the single sharing instance; and providing haptic feedback to the user input based on a feedback intensity value, wherein the feedback intensity value is determined based on a number of recommended photos that have been added to the group of recommend photos thereby providing an accumulation signal, to the user of the mobile device, with respect to the predefined maximum number of photos that can be shared in the single sharing instance; and in an event the user input swipes the recommended photo in the second swipe direction, applying a tag to the recommended photo, the tag indicating the second user intent to not share the recommended photo to the network destination.

2. The device of claim 1, wherein the recommended photo is included in the set of recommended photos based on metadata that indicates the recommended photo has not been reviewed by the user for sharing purposes, and the operations further comprise updating the metadata for the recommended photo to reflect that the recommended photo has been reviewed by the user for sharing purposes in response to receiving the user input that swipes the recommended photo.

3. The device of claim 1, wherein the operations further comprise displaying a sharing control user interface element that, when activated, implements at least the accessing, the configuring, and the displaying.

4. The device of claim 1, wherein the network destination comprises a preselected network destination determined based on additional user input received before configuring the set of recommended photos into the stacked configuration.

5. The device of claim 1, wherein the network destination is selected, based on additional user input, from a list of network destinations that is displayed in association with a first photo that is added to the group of recommended photos.

6. The device of claim 1, wherein the operations comprise associating a third swipe direction with a third user intent to share the recommended photo to another network destination that is different than the network destination.

7. The device of claim 1, wherein the haptic feedback is a first type of haptic feedback, and the operations further comprise:

determining that the predefined maximum number of photos that can be shared in the single sharing instance has been reached after a final recommended photo is added to the group of recommended photos; and providing a second type of haptic feedback in response to a corresponding user input that swipes the final recommended photo in the first swipe direction, the second type of haptic feedback indicating no more accumulation is possible.

8. A method comprising:

configuring, by one or more processing units, a set of items into a stacked configuration that enables a user of the mobile device to touch an item, on top of the stacked configuration, and swipe in different swipe directions;

associating a first swipe direction with a first user intent to send the item to a network destination;

associating a second swipe direction with a second user intent to not send the item to the network destination;

displaying the set of items in the stacked configuration;

receiving user input that swipes the item, on top of the stacked configuration, in one of the first swipe direction or the second swipe direction;

in an event the user input swipes the item in the first swipe direction:

adding the item to a group of items that is to be sent to the network destination; and providing haptic feedback to the user input based on a feedback intensity value, wherein the feedback intensity value increases as a number of items that have been added to the group of items increases thereby providing an accumulation signal to the user of the mobile device; and in an event the user input swipes the item in the second swipe direction, applying a tag to the item indicating the second user intent to not send the item to the network destination.

9. The method of claim 8, wherein the network destination is selected, based on additional user input, from a list of network destinations that is displayed in association with a first item that is added to the group of recommended items.

10. The method of claim 8, wherein the network destination implements a policy that limits the number of items to be sent to a predefined maximum number of items, and wherein the haptic feedback is a first type of haptic feedback, the method further comprising:

determining that the predefined maximum number of items has been reached after a final item is added to the group of items; and providing a second type of haptic feedback in response to a corresponding user input that swipes the final item in the first swipe direction, the second type of haptic feedback indicating no more accumulation is possible.

11. The method of claim 8, wherein the set of items comprises a set of photos.

12. A method comprising:

configuring, by one or more processing units, a set of items into a grid configuration that enables a user of the mobile device to employ a continuous user gesture to traverse the set of items;

displaying the set of items in the grid configuration;

determining whether the continuous user gesture pauses on an item for a predetermined period of time, wherein the predetermined period of time signals a first user intent to send the item to a network destination;

in an event the continuous user gesture pauses on the item for the predetermined period of time:

adding the item to a group of items to be sent to the network destination; and providing haptic feedback based on a feedback intensity value, wherein the feedback intensity value increases as a number of items that have been added to the group of items increases thereby providing an accumulation signal to the user of the mobile device;

in an event the continuous user gesture does not pause on the item for the predetermined period of time, applying a tag to the item indicating a second user intent to not send the item to the network destination.

13. The method of claim 12, further comprising:
determining that the continuous user gesture ends based on an elevation of an input mechanism that breaks physical contact with a display screen;
in response to determining that the continuous user gesture ends, displaying a list of network destinations in association with a position on a display screen where the continuous user gesture ends;
receiving user input that selects the network destination from the list of network destinations.

14. The method of claim 12, wherein the network destination implements a policy that limits the number of items to be sent to a predefined maximum number of items, and wherein the haptic feedback is a first type of haptic feedback, the method further comprising:
determining that the predefined maximum number of items has been reached after a final item is added to the group of items; and
providing a second type of haptic feedback in response to the continuous user gesture pausing on the final item for the predetermined period of time, the second type of haptic feedback indicating no more accumulation is possible.

15. The method of claim 12, further comprising:
determining that the continuous user gesture ends based on an elevation of an input mechanism that breaks physical contact with a display screen;
in response to determining that the continuous user gesture ends, displaying a confirmation control user interface element in association with a position on a display screen where the continuous user gesture ends; and
receiving user input, via the confirmation control user interface element, confirming a sharing experience has ended and no additional items are to be added to the group of items.

16. The method of claim 12, further comprising displaying a sharing control user interface element that, when activated, implements at least the configuring and the displaying.

17. The method of claim 12, wherein the network destination comprises a preselected network destination determined based on additional user input received before configuring the set of items into the grid configuration.

18. The method of claim 12, further comprising accessing items stored on the mobile device to identify a set of items as ones to be recommended for sharing.

19. The method of claim 18, wherein the set of items are ones that are recommended for sharing based on metadata that indicates an item has not been reviewed for sharing purposes, and the method further comprises updating the metadata for the item to reflect that the item has been reviewed for sharing purposes.

20. The method of claim 12, wherein the set of items comprises a set of photos.

* * * * *